US008349217B2

(12) United States Patent
Yamada et al.

(10) Patent No.: US 8,349,217 B2
(45) Date of Patent: Jan. 8, 2013

(54) METHOD FOR PRODUCING POSITIVE ELECTRODE MATERIAL FOR SECONDARY BATTERY

(75) Inventors: Atsuo Yamada, Kawasaki (JP); Shogo Hayase, Shioya-gun (JP); Yoshiki Fujita, Anan (JP); Shinichi Nishimura, Yamato (JP); Mamoru Tachikawa, Isehara (JP); Takakazu Hino, Yokohama (JP)

(73) Assignees: Tokyo Institute of Technology, Tokyo (JP); Dow Corning Toray Co., Ltd, Tokyo (JP)

( * ) Notice: Subject to any disclaimer, the term of this patent is extended or adjusted under 35 U.S.C. 154(b) by 446 days.

(21) Appl. No.: 12/532,956

(22) PCT Filed: Mar. 26, 2008

(86) PCT No.: PCT/JP2008/055749
§ 371 (c)(1),
(2), (4) Date: Feb. 18, 2010

(87) PCT Pub. No.: WO2008/123311
PCT Pub. Date: Oct. 16, 2008

(65) Prior Publication Data
US 2010/0140540 A1 Jun. 10, 2010

(30) Foreign Application Priority Data

Mar. 27, 2007 (JP) ................................. 2007-082102
Dec. 5, 2007 (JP) ................................. 2007-315091

(51) Int. Cl.
*H01B 1/00* (2006.01)
(52) U.S. Cl. ......................... 252/500; 385/140; 429/221

(58) Field of Classification Search .................. 252/500; 385/140; 429/218, 221
See application file for complete search history.

(56) References Cited

U.S. PATENT DOCUMENTS

| 3,293,194 A | 12/1966 | Lovie et al. |
| 4,312,970 A | 1/1982 | Gaul, Jr. |
| 4,340,619 A | 7/1982 | Gaul, Jr. |
| 4,395,460 A | 7/1983 | Gaul |

(Continued)

FOREIGN PATENT DOCUMENTS
EP 1134826 A1 9/2001
(Continued)

OTHER PUBLICATIONS

Article: Nametkin et al., "1,3-Disilacyclobutanes and Their Polymers", Academy of Sciences of the USSR., vol. 170, No. 5, (1966), pp. 972-975.

(Continued)

*Primary Examiner* — Khanh Tuan Nguyen
(74) *Attorney, Agent, or Firm* — Howard & Howard Attorneys PLLC

(57) ABSTRACT

The present invention has features in that a lithium transition metal silicate obtained by sintering a mixture containing a transition metal compound containing at least one transition metal selected from the group consisting of Mn, Fe, Co and Ni; a lithium compound; and a silicon-based polymer compound, is used as a positive electrode material for a secondary battery. The lithium transition metal silicate of the present invention has a high lithium occlusion and release efficiency per unit amount of a transition metal. A secondary battery in which the cost is low, stability and safety are high, and superior charge and discharge characteristics are exhibited can be provided.

9 Claims, 12 Drawing Sheets

X-ray diffraction patterns of Comparative Example 1

U.S. PATENT DOCUMENTS

| | | | |
|---|---|---|---|
| 4,397,828 | A | 8/1983 | Seyferth et al. |
| 4,404,153 | A | 9/1983 | Gaul, Jr. |
| 4,482,689 | A | 11/1984 | Haluska |
| 4,540,803 | A | 9/1985 | Cannady |
| 4,543,344 | A | 9/1985 | Cannady |
| 4,774,312 | A | 9/1988 | Burns |
| 4,835,238 | A | 5/1989 | Burns |
| 4,916,200 | A | 4/1990 | Burns |
| 4,929,742 | A | 5/1990 | Burns |
| 6,085,015 | A | 7/2000 | Armand et al. |
| 6,174,982 | B1 | 1/2001 | Nishida et al. |
| 2002/0195591 | A1* | 12/2002 | Ravet et al. ............. 252/500 |
| 2006/0083988 | A1 | 4/2006 | Deguchi et al. |
| 2007/0218370 | A1 | 9/2007 | Deguchi et al. |

FOREIGN PATENT DOCUMENTS

| | | | |
|---|---|---|---|
| JP | 63103812 | A | 5/1988 |
| JP | 4334551 | A | 11/1992 |
| JP | 11-204098 | * | 7/1999 |
| JP | 2001180939 | A | 7/2001 |
| JP | 2001266882 | A | 9/2001 |
| JP | 2002037620 | A | 2/2002 |
| JP | 2006261127 | A | 9/2006 |
| WO | WO 9829476 | A1 | 7/1998 |
| WO | WO 2005099022 | A1 | 10/2005 |
| WO | WO 2005099023 | A1 | 10/2005 |

OTHER PUBLICATIONS

Article: Kriner, "Catalytic Polymerization of 1,3-Disilacyclobutane Derivatives", Journal of Polymer Science, vol. 4, (1966), pp. 444-446.

Text Book: "Preparation of Polyorganosiloxanes", Noll, Chemistry & Technology of Silicones, 2nd Edition, 1968, Chapter 5, pp. 190-245.

Article: Cundy et al., "The Role of the Transition Metal in the Homogeneous Catalytic Polymerisation of Strained Organosilicon Heterocycles", Journal of Organometallic Chemistry, No. 44, (1972), pp. 291-297.

Article: Nametkin et al., "Polymerization of Silacyclobutane Monomers", Academy of Sciences of the USSR., vol. 208, No. 5, (1973) pp. 128-131.

Article: Dunogues et al., "New Polycarbosilane Models 1. Poly [(methylchlorosilylene)methylene], a Novel, Functional Polycarbosilane", Macromolecules American Chemical Society, (1988), vol. 21, pp. 30-34.

Article: Delgado et al., "Contrasting One- and Two-Cation Binding Behavior in syn- and anti-Anthraquinone Bibracchial . . . ", Journal American Chemical Society, (1988), vol. 110, pp. 119-124.

Article: Furukawa et al., "Optical Properties of Silicon Network Polymers", Macromolecules American Chemical Society, (1990), vol. 23, pp. 3423-3426.

Article: Sakamoto et al., "Highly Ordered High Molecular Weight Alternating Polysilylene Copolymer . . . ", Marcromolecules American Chemical Society, (1990), vol. 23, pp. 4494-4496.

Article: Shono et al., "Electroreductive Formation of Polysilanes", Journal American Chemical Society, (1990), pp. 1160-1161.

Article: Manning et al., "The Systematic Synthesis of Complexes containing u3-CS Ligands as Tow-electron Donors . . . ", Journal Chemical Society Chem Commun., (1992), p. 897-898.

M.E. Arroyo-De Dompablo, "On-demand Design of Polyoxianionic Cathode Materials Based on Electronegativity Correlations: An Exploration of the Li2MSiO4 System (M=Fe, Mn, Co, Ni)" Electrochemistry Communications, Copyright 2006 Elsevier B.V., Madrid Spain, 7 pages.

English language abstract for JP 63103812 extracted from espacenet.com database, dated Dec. 28, 2009, 5 pages.

English language abstract for JP 4334551 extracted from espacenet.com database, dated Dec. 28, 2009, 18 pages.

English language translation and abstract for JP 2001-180939 extracted from PAJ database, dated Dec. 29, 2009, 153 pages.

English language abstract for JP 2001-266882 extracted from espacenet.com database, dated Dec. 28, 2009, 23 pages.

English language translation and abstract for JP 2002-037620 extracted from PAJ database, dated Dec. 29, 2009, 53 pages.

English language translation and abstract for JP 2006-261127 extracted from PAJ database, dated Dec. 29, 2009, 61 pages.

English language abstract for WO 9829476 extracted from espacenet.com database, dated Dec. 28, 2009, 30 pages.

English language abstract for WO 2005099022 extracted from espacenet.com database, dated Dec. 28, 2009, 21 pages.

English language abstract for WO 2005099023 extracted from espacenet.com datebase, dated Dec. 28, 2009, 24 pages.

PCT International Search Report for PCT/JP2008/55749, dated Jul. 15, 2008, 4 pages.

Article: Burns et al., "Alkl- and arylsilsesquiazanes: effect of the R group on polymer degradation and ceramic char composition", Journal of Materials Science, No. 22, 1987, pp. 2609-2614.

Article: Nyten et al., "Electrochemical performance of Li2FeSiO4 as a new Li-battery cathode material", Electrochemistry Communications, No. 7, 2005, pp. 156-160.

Article: Jin et al., "An investigation of silicone-doped LiCoO2 as cathode in lithium-ion secondary batteries", Solid State Ionics, No. 177, 2006, pp. 317-322.

Chinese Office Action with English language translation for Chinese Application No. 200880009680.6 dated Apr. 21, 2011, 13 pages.

* cited by examiner

X-ray diffraction patterns of Comparative Example 1

X-ray diffraction patterns of Example 1

(b) Electron micrograph of Example 1

(a) Electron micrograph of Comparative Example 1

Discharge characteristics of Comparative Example 1 (dotted line) and Example 1 (solid line)

Example 1 =
Discharge characteristics shown by solid line
1 (right) : 1/30C,
2 (middle): 1/10C, 3 (left) : 1/5C Comparative Example 1 =
Discharge characteristics shown by dotted line
1 (right) : 1/30C,
2 (middle): 1/10C, 3 (left) : 1/5C (b) Electron micrograph of Example 2

(a) Electron micrograph of Comparative Example 2

Charge and discharge characteristics of Comparative Example 2 (FIG. 7(a)) and Example 2 (FIG. 7(b))

X-ray diffraction patterns of Comparative Example 3

X-ray diffraction patterns of Example 3

Electron micrograph of Comparative Example 3

Electron micrograph of Example 3

Discharge characteristics of Comparative Example 3

Discharge characteristics of Example 3

Charge and discharge characteristics of Example 4

METHOD FOR PRODUCING POSITIVE ELECTRODE MATERIAL FOR SECONDARY BATTERY

TECHNOLOGICAL FIELD

The present application claims priority to and all the advantages of International Patent Application No. PCT/JP2007/068496, filed on Mar. 26, 2008, which claims priority to Japanese Patent Application No. 2007-82102, filed in Japan on Mar. 27, 2007, and Japanese Patent Application No. 2007-315091, filed in Japan on Dec. 5, 2007, which are hereby incorporated by reference.

The present invention relates to a method for producing a positive electrode material capable of reversibly occluding and releasing a lithium ion, and relates to use of the aforementioned positive electrode material for a secondary battery.

BACKGROUND ART

As a secondary battery, a lead secondary battery, a nickel-cadmium secondary battery, nickel hydride battery, or the like has been conventionally used. Recently, performance of electronics such as a mobile phone, a video camera, a notebook-size personal computer, and the like is remarkably improved, and a requirement for improving performance of a secondary battery as a power source of the aforementioned electronics has also been increased.

A lithium ion secondary battery which is a nonaqueous electrolyte secondary battery using a lithium compound as a positive electrode material together with a carbonaceous material as a negative electrode material can control growth of dendrite and powderization of lithium by utilizing charging and discharging lithium. For this reason, superior cycle life performance can be provided, and high energy densification and high capacitization can be achieved. As the aforementioned lithium compound, for example, a lithium transition metal oxide such as $LiCoO_2$, $LiNiO_2$, $LiMn_2O_4$ or the like is put to practical use.

However, the lithium ion secondary batteries use expensive metals as constituent elements of positive electrode materials, and many conventional positive electrode materials represented by $LiCoO_2$, $LiNiO_2$ or $LiMn_2O_4$ have a reduced amount, such as about 0.5, of a lithium atom capable of being reversibly occluded and released per one transition metal atom. Therefore, more effective utilization of a transition metal, as well as, development for a positive electrode material based on abundant and cheap elements have been desired.

In addition, conventional positive electrode materials have, in general, problems in performance stability and safety. In particular, sufficient stability with respect to cycle characteristics at high temperatures, storage properties, self-discharging properties and the like is not exhibited, and in addition, there is a problem in safety in which oxygen generates due to thermal decomposition, and thereby, ignition may be caused. It is believed that this may be caused by not only high reactivity between an electrode and an electrolyte in a lithium ion secondary battery due to high voltage, but also the crystal structure of the electrode material itself.

Therefore, studies for further improving properties as a positive electrode of a lithium transition metal oxide have been carried out by substituting a part of the transition metal of the aforementioned lithium transition metal oxide with a nonmetal element such as phosphorus, silicon, boron or the like. For example, Japanese Unexamined Patent Application, First Publication No. 2001-180939; WO 2005/99022; and WO 2005/99023 report a technology for improving cycle characteristics at high temperatures, storage properties, self-discharging properties, and the like of a secondary battery by substituting about 10 to 20% of a transition metal of $LiMn_2O_4$, $LiCoO_2$ or the like with phosphorus, silicon, boron or the like.

However, in this case, for example, with respect to $LiCoO_2$, it is reported that a single phase is formed when the amount of silicon is up to 10%, but another phase is formed when the amount is 35% (Solid State Ionics (2006), 177 (3-4), 317-322). It can be mentioned that the system in which the transition metal is substituted with a small amount of silicon is clearly different from a lithium transition metal silicate in which the mole ratio of a transition metal and silicic acid is around 1:1.

On the other hand, with respect to a lithium transition metal silicate in which the mole ratio of a transition metal and silicic acid is around 1:1, for example, a lithium transition metal silicate in which lithium silicate is used as a silicon source is reported (Electrochemistry Communications 7 (2005) 156-160). Usability thereof as a positive electrode of a so-called lithium ion secondary battery is suggested.

However, a lithium transition metal silicate in which the mole ratio of a transition metal and silicic acid is around 1:1 is, in general, synthesized by sintering an inorganic compound such as an inorganic lithium salt, a transition metal salt, silica or the like, as a raw material at high temperatures. For this reason, it is difficult to control crystallinity, particle size, particle size distribution, and the like of a product. The performance thereof is not necessarily desirable as a positive electrode material, compared to conventional lithium transition metal oxides. These materials basically have problems in that the capacity of reversibly occluding and releasing a lithium ion is reduced, and charge and discharge characteristics are degraded in accordance with repeating charging and discharging.

[Patent Document 1] Japanese Unexamined Patent Application, First Publication No. 2001-180939
[Patent Document 2] WO 2005/99022
[Patent Document 3] WO 2005/99023
[Non-Patent Document 1] Solid State Ionics (2006), 177 (3-4), 317-322
[Non-Patent Document 2] Electrochemistry Communications 7 (2005) 156-160

DISCLOSURE OF THE INVENTION

Problems to be Solved by the Invention

The present invention was completed under the aforementioned circumstances of the prior art. An objective of the present invention is to provide a secondary battery in which (1) lithium occlusion and release efficiency per unit amount of a transition metal is high, (2) the cost is low, (3) stability and safety are high, and (4) superior charge and discharge characteristics are exhibited.

Means for Solving the Problems

The aforementioned objective can be achieved by obtaining a lithium transition metal silicate by sintering a mixture containing at least
(A) at least one transition metal selected from the group consisting of Mn, Fe, Co and Ni, and/or a transition metal compound containing the aforementioned transition metal;
(B) a lithium compound; and
(C) a silicon-based polymer compound, for producing a positive electrode material for a secondary battery containing the lithium transition metal silicate represented by the following formula:

$$Li_aM_bSi_cO_4$$

wherein M is at least one transition metal selected from the group consisting of Mn, Fe, Co and Ni; a, b and c are numbers satisfying $1<a\leq3$, $0.5\leq b\leq1.5$, and $0.5\leq c\leq1.5$.

The aforementioned sintering temperature is preferably not more than 900° C. The obtained lithium transition metal silicate is preferably in the form of a particle having an average primary particle size of less than 500 nm.

In addition, the compound containing the transition metal in the aforementioned component (A) is preferably at least one transition metal compound selected from the group consisting of transition metal oxides, transition metal hydroxides, transition metal alkoxides, transition metal carboxylates, transition metal acetylacetonates, transition metal ethyl acetoacetates, transition metal carbonates, transition metal nitrates, transition metal sulfates, transition metal halides, and carbonyl complexes of the transition metals.

In addition, the lithium compound of the aforementioned component (B) is preferably at least one lithium compound selected from the group consisting of lithium oxide, lithium hydroxide, lithium alkoxides, lithium carboxylates, lithium acetylacetonate, lithium ethyl acetoacetate, lithium carbonate, lithium nitrate, lithium sulfate, and lithium halides.

The silicon-based polymer compound of the aforementioned component (C) is preferably at least one silicon-based polymer compound selected from the group consisting of polysilanes, polysilazanes, polysiloxanes, polycarbosilanes, and mixtures thereof. In particular, a polyphenylsilsesquioxane represented by the following repeating unit:

$$C_6H_5SiO_{1.5}$$

A positive electrode for use in a secondary battery formed from the positive electrode material for a secondary battery produced in accordance with the aforementioned production method is suitably utilized as a component of a secondary battery.

Effects of the Invention

According to the present invention, particles of a lithium transition metal silicate in which the average particle size is small, the particle size distribution is narrow, and superior performance as a positive electrode material for a secondary battery is exhibited can be synthesized by a simple preparation process.

In addition, by using the aforementioned particles of the lithium transition metal silicate as a positive electrode material, a secondary battery can be provided in which lithium-occluding and releasing efficiency per unit amount of the transition metal is increased, cost is low, high safety and stability are exhibited, and superior charge and discharge characteristics are exhibited. In particular, in the secondary battery of the present invention, stability is greatly improved under high-temperature conditions.

BEST MODES FOR CARRYING OUT THE INVENTION

Figure 1:
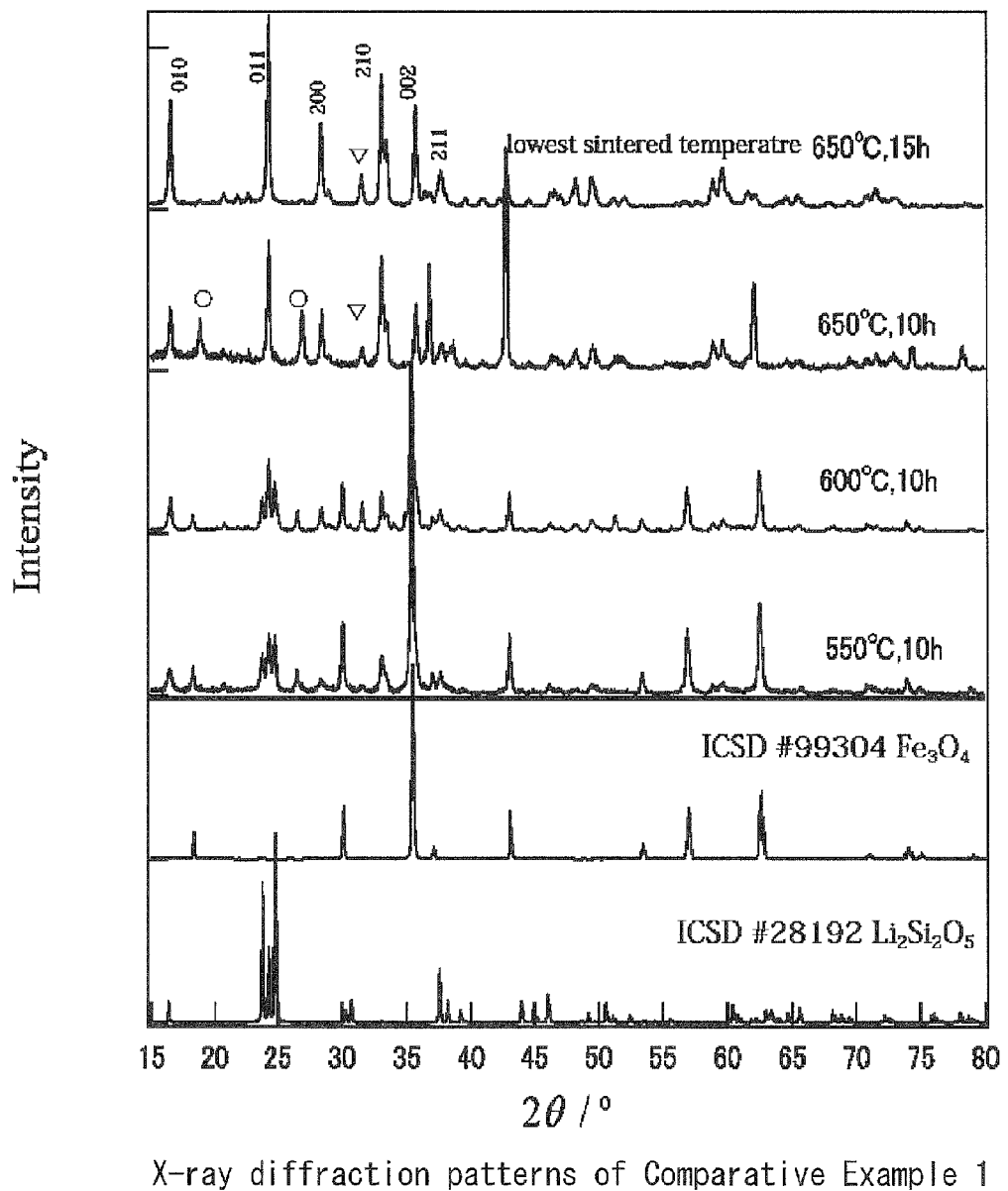
FIG. 1 X-ray diffraction patterns of Comparative Example 1.

The method for producing a positive electrode material for a secondary battery according to the present invention is characterized by using the silicon-based polymer compound as a silicon source. By mixing the aforementioned silicon-based polymer compound of component (C) with the lithium compound (B) and the transition metal and/or the transition metal compound (A), and sintering the aforementioned mixture, a lithium transition metal silicate in which the primary particle size, the particle size distribution, and the crystalline system are controlled can be obtained. A positive electrode material formed from the lithium transition metal silicate produced by the production method of the present invention can reversibly occlude and release lithium with increased efficiency, and at the same time, superior stability and superior safety are exhibited.

Types of the silicon-based polymer compound of component (C) used in the present invention is not particularly limited as long as the polymer compound is an oligomer or polymer containing silicon. As examples of the aforementioned silicon-based polymer compounds, mention may be made of, for example, polysilanes formed from structural units characterized by having a silicon-silicon bond, polysilazanes formed from structural units characterized by having a silicon-nitrogen-silicon bond, polysiloxanes formed from structural units characterized by having a silicon-oxygen-silicon bond, polycarbosilanes formed from structural units characterized by having a silicon-carbon-silicon bond, and mixtures thereof.

As the polysilane, for example, a polysilane represented by the following average unit formula (I):

$$(R^1R^2R^3Si)_d(R^3R^4Si)_e(R^5Si)_f(Si)_g \quad (I)$$

wherein $R^1$ to $R^5$ independently represent a hydrogen atom, a substituted or unsubstituted monovalent hydrocarbon group having 1 to 20 carbon atoms, an alkoxy group, or a halogen atom; and d, e, f and g represent 0 or a positive number, with the proviso that $d+e+f+g=1$, can be used.

The polysilane represented by the aforementioned average unit formula (I) is composed of at least one unit among structural units represented by $(R^1R^2R^3Si)$, $(R^3R^4Si)$, $(R^5Si)$ and (Si). More particularly, as examples thereof, mention may be made of, for example, a straight-chain polysilane formed from $(R^1R^2R^3Si)$ and $(R^3R^4Si)$ units; a cyclic polysilane formed from $(R^3R^4Si)$ units; a branched chain polysilane (polysilyne) formed from $(R^5Si)$ or (Si) units; a polysilane formed from $(R^1R^2R^3Si)$ and $(R^5Si)$ units; a polysilane formed from $(R^1R^2R^3Si)$ and (Si) units; a polysilane formed from $(R^5Si)$ and (Si) units; a polysilane formed from $(R^3R^4Si)$ and $(R^5Si)$ units; a polysilane formed from $(R^3R^4Si)$ and (Si) units; a polysilane formed from $(R^1R^2R^3Si)$, $(R^3R^4Si)$ and $(R^5Si)$ units; a polysilane formed from $(R^1R^2R^3Si)$, $(R^3R^4Si)$ and (Si) units; a polysilane formed from $(R^1R^2R^3Si)$, $(R^5Si)$ and (Si) units; a polysilane formed from $(R^3R^4Si)$, $(R^5Si)$ and (Si) units; a polysilane formed from $(R^1R^2R^3Si)$, $(R^3R^4Si)$, $R^5Si$) and (Si) units; and the like. The preferable number of repeating units represented by $(R^1R^2R^3Si)$, $(R^3R^4Si)$, $(R^5Si)$ and (Si) independently ranges from 2 to 10,000, more preferably ranges from 3 to 1,000 and more preferably ranges from 3 to 500.

As the aforementioned hydrocarbon group, a monovalent hydrocarbon group selected from the group consisting of an alkyl group, an alkenyl group, an aralkyl group and an aryl group is preferable.

As the alkyl group, a $C_1$-$C_{12}$ alkyl group is preferable, and a $C_1$-$C_6$ alkyl group is more preferable. The alkyl group is preferably one of a straight chain or branched chain alkyl group, a cycloalkyl group, and a cycloalkylene group (an alkyl group formed from a combination of a straight chain or branched chain alkylene group which is preferably a $C_1$-$C_6$ alkylene group such as a methylene group or an ethylene group and a carbon ring which is preferably a $C_3$-$C_8$ ring).

As the straight chain or branched chain alkyl group, a straight chain or branched chain $C_1$-$C_6$ alkyl group is preferable. As examples thereof, mention may be made of, for example, a methyl group, an ethyl group, an n-propyl group, an isopropyl group, a butyl group, a t-butyl group, a pentyl group, a hexyl group, and the like. In particular, a methyl group is preferable.

As the cycloalkyl group, a $C_4$-$C_6$ alkyl group is preferable. As examples thereof, mention may be made of, for example, a cyclobutyl group, a cyclopentyl group, a cyclohexyl group and the like. A cyclopentyl group and a cyclohexyl group are preferable.

As the alkenyl group, a $C_2$-$C_{12}$ alkenyl group is preferable, and a $C_2$-$C_6$ alkenyl group is more preferable. As examples of $C_2$-$C_6$ alkenyl groups, mention may be made of a vinyl group, a propenyl group, a butenyl group, a pentenyl group, a hexenyl group, and the like. In particular, a vinyl group is preferable.

As the aralkyl group, a $C_7$-$C_{12}$ aralkyl group is preferable. As examples of $C_7$-$C_{12}$ aralkyl groups, mention may be made of a benzyl group, a phenethyl group, a phenylpropyl group, and the like.

As the aryl group, a $C_6$-$C_{12}$ aryl group is preferable. As examples thereof, mention may be made of a phenyl group, a naphthyl group, and a tolyl group.

The aforementioned hydrocarbon group may have a substituent. As examples of the aforementioned substituents, mention may be made of a halogen such as a fluorine atom, a chlorine atom, a bromine atom, an iodine atom, or the like: a hydroxy group; a $C_1$-$C_6$ alkoxy group such as a methoxy group, an ethoxy group, an n-propoxy group, an isopropoxy group, or the like; an amino group; an amide group; a nitro group; an epoxy group; and the like. The substituent can bind at any position of a hydrocarbon chain, a saturated or unsaturated ring, and an aromatic ring.

In addition, as examples of the alkoxy groups for $R^1$ to $R^5$, mention may be made of a methoxy group, an ethoxy group, an n-propoxy group, and an isopropoxy group.

In addition, as examples of the halogen atoms for $R^1$ to $R^5$, mention may be made of a fluorine atom, a chlorine atom, a bromine atom, or an iodine atom.

The aforementioned polysilanes can be prepared by means of various known methods. As examples thereof, mention may be made of, for example, a method in which a dehalogenation reaction of a halosilane is carried out in the presence of an alkali metal (J. Am. Chem. Soc., 110, 124 (1988); Macromolecules, 23, 3423 (1990); and the like), a method in which an anion polymerization of disilene is carried out (Macromolecules, 23, 4494 (1990) and the like), a method in which a dehalogenation reaction of a halosilane by means of electrode reduction (J. Chem. Soc., Chem. Commun., 1161 (1990); J. Chem. Soc., Chem. Commun., 897 (1992); and the like), a method in which a dehalogenation reaction of a halosilane is carried out in the presence of magnesium (WO 98/29476 and the like), a method in which a dehydrogenation reaction of a hydrosilane is carried out in the presence of a metal catalyst (Japanese Unexamined Patent Application, First Publication No. H04-334551 and the like), and the like.

The polysilane may be a copolymer with another polymer. For example, a copolymer formed from a polysilane unit and a silalkylene (such as silethylene) unit; a copolymer formed from a polysilane unit and a silarylene (such as silphenylene) unit; a copolymer formed from a polysilane unit and a polysilazane unit; a copolymer formed from a polysilane unit and a polysiloxane unit; or the like may be used as a polysiloxane.

As the polysilazane, for example, one represented by the following average unit formula (II):

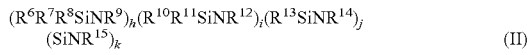

$$(R^6R^7R^8SiNR^9)_h(R^{10}R^{11}SiNR^{12})_i(R^{13}SiNR^{14})_j(SiNR^{15})_k \quad (II)$$

wherein
$R^6$ to $R^{15}$ independently represent a hydrogen atom, a substituted or non-substituted monovalent hydrocarbon group having 1 to 20 carbon atoms, an alkoxy group, or a halogen atom; and
h, i, j, and k represent 0 or a positive number, with the proviso that h+i+j+k=1, can be used. The hydrocarbon group used here has the same meanings as defined in the aforementioned $R^1$ to $R^5$.

The polysilazane represented by the aforementioned average unit formula (II) is composed of at least one unit selected from the structural units represented by $(R^6R^7R^8SiNR^9)$, $(R^{10}R^{11}SiNR^{12})$, $(R^{13}SiNR^{14})$, and $(SiNR^{15})$. As examples thereof, mention may be made of, for example, a straight chain polysilazane formed from $(R^6R^7R^8SiNR^9)$ and $(R^{10}R^{11}SiNR^{12})$ units; a cyclic polysilazane formed from $(R^{10}R^{11}SiNR^{12})$ units; a branched chain polysilazane formed from $(R^{13}SiNR^{14})$ or $(SiNR^{15})$ units; a polysilazane formed from $(R^6R^7R^8SiNR^9)$ and $(R^{13}SiNR^{14})$ units; a polysilazane formed from $(R^6R^7R^8SiNR^9)$ and $(SiNR^{15})$ units; a polysilazane formed from $(R^{13}SiNR^{14})$ and $(SiNR^{15})$ units; a polysilazane formed from $(R^{10}R^{11}SiNR^{12})$ and $(R^{13}SiNR^{14})$ units; a polysilazane formed from $(R^{10}R^{11}SiNR^{12})$ and $(SiNR^{15})$ units; a polysilazane formed from $(R^6R^7R^8SiNR^9)$, $(R^{10}R^{11}SiNR^{12})$ and $(R^{13}SiNR^{14})$ units; a polysilazane formed from $(R^6R^7R^8SiNR^9)$, $(R^{10}R^{11}SiNR^{12})$ and $(SiNR^{15})$ units; a polysilazane formed from $(R^6R^7R^8SiNR^9)$, $(R^{13}SiNR^{14})$ and $(SiNR^{15})$ units; a polysilazane formed from $(R^{10}R^{11}SiNR^{12})$, $(R^{13}SiNR^{14})$ and $(SiNR^{15})$ units; polysilazane formed from $(R^6R^7R^8SiNR^9)$, $(R^{10}R^{11}SiNR^{12})$, $(R^{13}SiNR^{14})$ and $(SiNR^{15})$ units; and the like. The preferable number of the repeated structural units represented by $(R^6R^7R^8SiNR^9)$, $(R^{10}R^{11}SiNR^{12})$, $(R^{13}SiNR^{14})$ and $(SiNR^{15})$ independently ranges from 2 to 10,000, more preferably ranges from 3 to 1,000, and in particular, preferably ranges from 3 to 500.

The polysilazanes can be prepared in accordance with known methods in the art. The production methods for polysilazanes are described in, for example, U.S. Pat. No. 4,312,970, U.S. Pat. No. 4,340,619, U.S. Pat. No. 4,395,460, U.S. Pat. No. 4,404,153, U.S. Pat. No. 4,482,689, U.S. Pat. No. 4,397,828, U.S. Pat. No. 4,540,803, U.S. Pat. No. 4,543,344, U.S. Pat. No. 4,835,238, U.S. Pat. No. 4,774,312, U.S. Pat. No. 4,929,742, and U.S. Pat. No. 4,916,200. In addition, they are also described in Burns et al., in J. Mater. Sci., 22 (1987), pp 2609-2614.

The polysilazane may be a copolymer with another polymer. For example, a copolymer formed from a polysilazane unit and a silalkylene (such as silethylene) unit; a copolymer formed from a polysilazane unit and a silarylene (such as silphenylene) unit; a copolymer formed from a polysilazane unit and a polysiloxane (such as —(CH$_3$)$_2$SiO—) unit; and the like can be used as a polysilazane.

As the polysiloxane, for example, one represented by the following average unit formula (III):

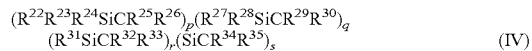

$(R^{16}R^{17}R^{18}SiO_{1/2})_l(R^{19}R^{20}SiO_{2/2})_m(R^{21}SiO_{3/2})_n$
$(SiO_{4/2})_o$ (III)

wherein
$R^{16}$ to $R^{21}$ independently represent a hydrogen atom, a substituted or non-substituted monovalent hydrocarbon group having 1 to 20 carbon atoms, an alkoxy group, or a halogen atom; and
l, m, n, and o represent 0 or a positive number, with the proviso that l+m+n+o=1, can be used. The hydrocarbon group used here has the same meanings as those defined in the aforementioned $R^1$ to $R^5$.

The polysiloxane represented by the aforementioned average unit formula (III) is composed of at least one unit selected from the structural units represented by $(R^{16}R^{17}R^{18}SiO_{1/2})$, $(R^{19}R^{20}SiO_{2/2})$, $(R^{21}SiO_{3/2})$ and $(SiO_{4/2})$. As examples thereof, mention may be made of, for example, a straight chain polysiloxane formed from $(R^{16}R^{17}R^{18}SiO_{1/2})$ and $(R^{19}R^{20}SiO_{2/2})$ units; a cyclic polysiloxane formed from $(R^{19}R^{20}SiO_{2/2})$ units; a branched chain polysiloxane formed from $(R^{21}SiO_{3/2})$ or $(SiO_{4/2})$ units; a polysiloxane formed from $(R^{16}R^{17}R^{18}SiO_{1/2})$ and $(R^{21}SiO_{3/2})$ units; a polysiloxane formed from $(R^{16}R^{17}R^{18}SiO_{1/2})$ and $(SiO_{4/2})$ units; a polysiloxane formed from $(R^{21}SiO_{3/2})$ and $(SiO_{4/2})$ units; a polysiloxane formed from $(R^{19}R^{20}SiO_{2/2})$ and $(R^{21}SiO_{3/2})$ units; a polysiloxane formed from $(R^{19}R^{20}SiO_{2/2})$ and $(SiO_{4/2})$; a polysiloxane formed from $(R^{16}R^{17}R^{18}SiO_{1/2})$, $(R^{19}R^{20}SiO_{2/2})$ and $(R^{21}SiO_{3/2})$ units; a polysiloxane formed from $(R^{16}R^{17}R^{18}SiO_{1/2})$, $(R^{19}R^{20}SiO_{2/2})$ and $(SiO_{4/2})$ units; a polysiloxane formed from $(R^{16}R^{17}R^{18}SiO_{1/2})$, $(R^{21}SiO_{3/2})$ and $(SiO_{4/2})$ units; a polysiloxane formed from $(R^{19}R^{20}SiO_{2/2})$, $(R^{21}SiO_{3/2})$ and $(SiO_{4/2})$ units; a polysiloxane formed from $(R^{16}R^{17}R^{18}SiO_{1/2})$, $(R^{19}R^{20}SiO_{2/2})$, $(R^{21}SiO_{3/2})$ and $(SiO_{4/2})$ units; and the like. The preferable number of repeated structural units represented by $(R^{16}R^{17}R^{18}SiO_{1/2})$, $(R^{19}R^{20}SiO_{2/2})$, $(R^{21}SiO_{3/2})$ and $(SiO_{4/2})$ independently ranges from 2 to 10,000, more preferably ranges from 3 to 1,000, and in particular, preferably ranges from 3 to 500.

The polysiloxanes can be prepared by known methods in the art. The production methods for the polysiloxanes are not particularly limited. Most generally, the polysiloxanes can be prepared by hydrolysis of organochlorosilanes. The aforementioned methods and other methods are described in Noll, Chemistry and Technology of Silicones, Chapter 5 (second edition, translated into German, Academic Press, 1968).

The polysiloxane may be a copolymer with another polymer. For example, a copolymer formed from a polysiloxane unit and a silalkylene (such as silethylene) unit; a copolymer formed from a polysiloxane unit and a silarylene (such as silphenylene) unit; a copolymer formed from a polysiloxane unit and a polysilazane unit; a copolymer formed from a polysiloxane unit and a polysilane unit; and the like can be used as the polysiloxane.

As the polycarbosilanes, for example, a polycarbosilane represented by the following average structural formula (IV):

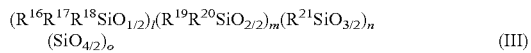

$(R^{22}R^{23}R^{24}SiCR^{25}R^{26})_p(R^{27}R^{28}SiCR^{29}R^{30})_q$
$(R^{31}SiCR^{32}R^{33})_r(SiCR^{34}R^{35})_s$ (IV)

wherein
$R^{22}$ to $R^{35}$ independently represent a hydrogen atom, a substituted or non-substituted monovalent hydrocarbon group having 1 to 20 carbon atoms, an alkoxy group, or a halogen atom; and
p, q, r and s represent 0 or a positive number, with the proviso that p+q+r+s=1, can be used. The hydrocarbon group used here has the same meanings as defined in the aforementioned $R^1$ to $R^5$.

The polycarbosilane represented by the aforementioned average unit formula (IV) is composed of at least one unit selected from the structural units represented by $(R^{22}R^{23}R^{24}SiCR^{25}R^{26})$, $(R^{27}R^{28}SiCR^{29}R^{30})$, $(R^{31}SiCR^{32}R^{33})$ and $(SiCR^{34}R^{35})$. As examples thereof, mention may be made of, for example, a straight chain polycarbosilane formed from $(R^{22}R^{23}R^{24}SiCR^{25}R^{26})$ and $(R^{27}R^{28}SiCR^{29}R^{30})$ units; a cyclic polycarbosilane formed from $(R^{27}R^{28}SiCR^{29}R^{30})$ units; a branched chain polycarbosilane formed from $(R^{31}SiCR^{32}R^{33})$ or $(SiCR^{34}R^{35})$ units; a polycarbosilane formed from $(R^{22}R^{23}R^{24}SiCR^{25}R^{26})$ and $(R^{31}SiCR^{32}R^{33})$ units; a polycarbosilane formed from $(R^{22}R^{23}R^{24}SiCR^{25}R^{26})$ and $(SiCR^{34}R^{35})$ units; a polycarbosilane formed from $(R^{31}SiCR^{32}R^{33})$ and $(SiCR^{34}R^{35})$ units; a polycarbosilane formed from $(R^{27}R^{28}SiCR^{29}R^{30})$ and $(R^{31}SiCR^{32}R^{33})$ units; a polycarbosilane formed from $(R^{27}R^{28}SiCR^{29}R^{30})$ and $(SiCR^{34}R^{35})$ units; a polycarbosilane formed from $(R^{22}R^{23}R^{24}SiCR^{25}R^{26})$, $(R^{27}R^{28}SiCR^{29}R^{30})$ and $(R^{31}SiCR^{32}R^{33})$ units; a polycarbosilane formed from $(R^{22}R^{23}R^{24}SiCR^{25}R^{26})$, $(R^{27}R^{28}SiCR^{29}R^{30})$ and $(SiCR^{34}R^{35})$ units; a polycarbosilane formed from $(R^{22}R^{23}R^{24}SiCR^{25}R^{26})$, $(R^{31}SiCR^{32}R^{33})$ and $(SiCR^{34}R^{35})$ units; a polycarbosilane formed from $(R^{27}R^{28}SiCR^{29}R^{30})$, $(R^{31}SiCR^{32}R^{33})$ and $(SiCR^{34}R^{35})$ units; a polycarbosilane formed from $(R^{22}R^{23}R^{24}SiCR^{25}R^{26})$, $(R^{27}R^{28}SiCR^{29}R^{30})$, $(R^{31}SiCR^{32}R^{33})$ and $(SiCR^{34}R^{35})$ units; and the like. The preferable number of the repeated structural units represented by $(R^{22}R^{23}R^{24}SiCR^{25}R^{26})$, $(R^{27}R^{28}SiCR^{29}R^{30})$, $(R^{31}SiCR^{32}R^{33})$ and $(SiCR^{34}R^{35})$ independently ranges from 2 to 10,000, more preferably ranges from 3 to 1,000, and in particular, preferably ranges from 3 to 500.

The polycarbosilanes can be prepared in accordance with known methods in the art. The production methods for polycarbosilanes are described in, for example, J. Dunogues, et al., Macromolecules, 21, 30 (1988); U.S. Pat. No. 3,293,194; N. S. Nametkin, et al., Dokl. Akad. Nauk SSSR, 208, 1112 (1973); W. A. Kriner, J. Polym. Sci., Part A-1, 4, 444 (1966); N. S. Nametkin, et al., Dokl. Akad. Nauk SSSR, 170, 1088 (1966); and C. S. Cundy, C. Eaborn, M. F. Lappert, J. Organomet. Chem., 44 (2), 291 (1972).

The polycarbosilane may be a copolymer with another polymer. For example, a copolymer formed from a polycarbosilane unit and a silalkylene (such as silethylene) unit; a copolymer formed from a polycarbosilane unit and a silarylene (such as silphenylene) unit; a copolymer formed from a polycarbosilane unit and a polysiloxane (such as —(CH$_3$)$_2$SiO—) unit; and the like can be used as a polycarbosilane.

The form of the polysilane, polysilazane, polysiloxane, and polycarbosilane is not particularly limited, and may be a solid, liquid, or paste form, and the like. In view of handling properties, and the like, a solid form is preferable.

Among the aforementioned silicon-based polymer compounds, the polysiloxanes formed from units having silicon-oxygen-silicon bonds are preferable, in view of industrial advantages in that the amount of silicon is not remarkably reduced, sufficient chemical stability is exhibited, it is easy to handle at room temperature in air, the raw material price and the production cost are low, and sufficient economic efficiency is exhibited.

Among polysiloxanes, in view of cost, availability, reactivity, and reaction controllability, a polymer formed from the structural unit having a hydrogen atom, or a methyl, n-propyl, phenyl, methoxy, or ethoxy group as a substituent on the silicon atom is particularly preferable. In addition, considering problems of cleavage of the main chain of the polymer and dissipation of molecules with a low molecular weight accompanied therewith, poly(methylphenyl)siloxane, poly(diphenyl)siloxane, poly(dimethoxy)siloxane, and poly(diethoxy) siloxane are preferable. In particular, a so-called silicone resin having a siloxane bond having two or more silicons on average is preferable.

As examples of the aforementioned silicone resins, mention may be made of, for example,
a poly(hydrogensilsesquioxane) represented by the following repeating unit: HSiO$_{1.5}$;
a poly(phenylsilsesquioxane) represented by the following repeating unit: C$_6$H$_5$SiO$_{1.5}$;
a poly(methylsilsesquioxane) represented by the following repeating unit: CH$_3$SiO$_{1.5}$;
a copolymer of phenylsilsesquioxane represented by the following repeating unit: C$_6$H$_5$SiO$_{1.5}$ and dimethylsiloxane represented by the following repeating unit: (CH$_3$)$_2$SiO;
a copolymer of methylsilsesquioxane represented by the following repeating unit: CH$_3$SiO$_{1.5}$ and dimethylsiloxane represented by the following repeating unit: (CH$_3$)$_2$SiO;
a copolymer of phenylsilsesquioxane represented by the following repeating unit: C$_6$H$_5$SiO$_{1.5}$ and n-propylsilsesquioxane represented by the following repeating unit: n-C$_3$H$_7$SiO$_{1.5}$;
a poly(dimethoxysiloxane) represented by the following repeating unit: (CH$_3$O)$_2$SiO;
a poly(diethoxysiloxane) represented by the following repeating unit: (C$_2$H$_5$O)$_2$SiO;
a poly(methoxysilsesquioxane) represented by the following repeating unit: CH$_3$OSiO$_{1.5}$; and
a poly(ethoxysilsesquioxane) represented by the following repeating unit: C$_2$H$_5$OSiO$_{1.5}$.
A phenylsilicone resin such as a poly(phenylsilsesquioxane) represented by the following repeating unit:

$$C_6H_5SiO_{1.5}$$

or the like is preferable.

The lithium compound of the aforementioned component (B) is not particularly limited as long as the compound contains a lithium element. For example, an oxide; a hydroxide; an alkoxide such as methoxide, ethoxide or the like; a carboxylate such as acetate, oxalate or the like; an acetylacetonate; an ethyl acetoacetate; a carbonate; a nitrate; or a sulfate of lithium, or a lithium halide such as lithium chloride, lithium bromide, lithium iodide or the like can be used. As the aforementioned component (B), two or more types of the aforementioned lithium compounds can be used.

The transition metal compound of the aforementioned component (A) is not particularly limited as long as a compound contains at least one transition metal selected from the group consisting of manganese, iron, cobalt and nickel. For example, an oxide; a hydroxide; an alkoxide such as methoxide, ethoxide or the like; a carboxylate such as acetate, oxalate or the like; an acetylacetonate; an ethyl acetoacetate; a carbonate; a nitrate; a sulfate; a halide such as chloride, bromide, iodide or the like of the aforementioned transition metal as well as carbonyl complexes with the aforementioned metals can be used. In addition, in the case of carrying out the production method of the present invention under an air atmosphere (or under an oxidation atmosphere), the transition metal can be used as a raw material of the aforementioned component (A). In addition, in the case of carrying out the production method of the present invention under an inert atmosphere, a mixture of fine powders of the transition metal and the transition metal compound in the oxidation state of +3 valent, +4 valent or higher valent can be used as the aforementioned component (A).

The transition metal compound of the aforementioned component (A) is selected from those comprising one selected from the group consisting of manganese iron, cobalt and nickel. As the aforementioned component (A), two or more types of different metals or transition metal compounds can be used. In other word, two types of transition metal compounds such as a manganese compound and an iron compound, a manganese compound and a cobalt compound, a manganese compound and a nickel compound, an iron compound and a cobalt compound, an iron compound and a nickel compound, or a cobalt compound and a nickel compound may be used; three types of transition metal compounds such as a manganese compound, an iron compound and a nickel compound may be used; and in addition, a mixture of four types of transition metal compounds of manganese, iron, cobalt and nickel may be used. A positive electrode material of the lithium transition metal silicate containing plural transition metals can occlude and release a larger amount of a lithium ion per unit amount of the transition metal. Therefore, an improvement in the charge and discharge rate, an improvement of stability of crystal lattice, and enhancement of chemical stability can be expected.

In the present invention, the aforementioned transition metal compound, the aforementioned lithium compound and the aforementioned silicon-based polymer compound are mixed, and the aforementioned mixture is sintered. Thereby, a lithium transition metal silicate represented by the following formula:

$$Li_aM_bSi_cO_4$$

wherein M is at least one transition metal selected from the group consisting of Mn, Fe, Co and Ni; and a, b and c are numbers satisfying $1<a\leq3$, $0.5\leq b\leq1.5$, and $0.5\leq c\leq1.5$, can be obtained. In a more preferable mode of the composition of the sintered product, a, b, and c are numbers satisfying $0<a\leq2.66$, $0.67\leq b\leq1.33$, and $0.67\leq c\leq1.33$. In a particularly preferable mode, a, b, and c are numbers satisfying $0<a\leq2.4$, $0.8\leq b\leq1.2$, and $0.8\leq c\leq1.2$. It is preferable that b+c be numbers satisfying $1.2\leq b+c\leq2.8$, is more preferable that b+c be numbers satisfying $1.5\leq b+c\leq2.5$, and is, in particular, preferable that b+c be numbers satisfying $1.8\leq b+c\leq2.2$. The lithium transition metal silicate obtained in the present invention may contain at least one transition metal element selected from cobalt, manganese, iron and nickel, and may contain other elements such as Cu, Cr, Ti, Mg, Al, Zr, Nb, K, B, P, Ga, Ge, S and the like, in addition thereto. As examples of the aforementioned lithium transition metal silicates, mention may be made of, for example, $Li_2CoSiO_4$, $Li_2FeSiO_4$, $Li_2MnSiO_4$, $Li_2NiSiO_4$, $Li_2Fe_{0.5}Mn_{0.5}SiO_4$ and the like. In addition, the aforementioned lithium transition metal silicate may contain lattice defects in the crystal structure thereof.

The mode of mixing as described is not particularly limited. For example, the aforementioned lithium compound, the aforementioned transition metal and/or transition metal compound, and the aforementioned silicon-based polymer compound, in which lithium, the transition metal and silicon are contained in an amount corresponding to a mole ratio of lithium, transition metal and silicon of the objective lithium transition metal silicate can be mixed while pulverizing. In addition, at the time of pulverizing and mixing as described above, an organic solvent such as acetone, alcohol or the like is preferably added. In the case of using a raw material of which a part may be eliminated due to evaporation or the like, as in the case of a straight chain polysiloxane, an excess amount of the raw material is used, and thereby, it can be prevented that the composition of the obtained sintered product departs from the objective composition.

The mode of sintering as described above is not limited either. For example, the sintering conditions can be appropriately selected in accordance with the oxidation state of the raw materials and redox stability under the sintering conditions of the objective lithium transition metal silicate. For example, in the case of obtaining a lithium transition metal silicate (such as $Li_2CoSiO_4$) which is oxidatively stable, sintering under an air atmosphere (or under an oxidation atmosphere) can be carried out. On the other hand, in the case of obtaining a lithium transition metal silicate (such as $Li_2FeSiO_4$) which is oxidatively unstable, sintering is preferably carried out under a non-oxidative atmosphere such as argon or nitrogen or under an inert gas atmosphere containing a reductive gas such as a hydrogen gas, carbon monoxide or the like.

The aforementioned sintering temperature is not particularly limited. The sintering temperature is preferably 900° C. or less, and in particular, preferably ranges from 500° C. to 900° C., more preferably ranges from 500° C. to 800° C., and particularly preferably ranges from 500° C. to 700° C. At temperatures exceeding the upper limit of the aforementioned range, crystals of the obtained lithium transition metal silicate grow to form large particles, and therefore, this is not preferable. On the other hand, at temperatures below the lower limit of the aforementioned range, it is difficult to produce a lithium transition metal silicate.

The lithium transition metal silicate obtained as described above is in the form of fine particles in which the average particle size is small and the particle size distribution is narrow, and has superior performance as a positive electrode material of a secondary battery. The average primary particle size of the lithium transition metal silicate is preferably less than 500 nm, more preferably less than 300 nm, further preferably less than 200 nm, and in particular, preferably less than 100 nm.

A positive electrode for a secondary battery can be produced with the fine particles of the lithium transition metal silicate obtained by means of the production method of the present invention in accordance with a common method in the art. For example, the aforementioned lithium transition metal silicate is mixed with a conductive agent such as carbon black, acetylene black or the like, and a binder such as poly (vinylidene fluoride) or the like, followed by carrying the mixture on a positive electrode collector formed from a metal foil or the like. Thereby, a positive electrode can be produced. At the time of mixing as described above, an organic solvent such as dimethylformamide or the like may be added, if necessary.

The positive electrode of the present invention can reversibly occlude and release lithium with high efficiency with respect to the unit amount of the transition metal, and superior stability and safety are exhibited. In addition, the elemental components of the lithium transition metal silicate forming the positive electrode are abundant in natural resources, and the production method is simple. For this reason, the production cost of the positive electrode can be controlled.

The secondary battery of the present invention is composed of the aforementioned positive electrode, a negative electrode formed from negative electrode materials capable of reversibly occluding and releasing lithium, and a non-aqueous electrolyte.

The raw materials of the aforementioned negative electrode materials are not particularly limited as long as they can reversibly occlude and release lithium. A carbonaceous material, an oxide material or an alloy material, which has an increased lithium capacity (an amount in which lithium can be doped) is preferable.

As the aforementioned carbonaceous material, pyrolytic carbons, cokes (such as pitch coke, needle coke, petroleum coke, and the like), graphite, glassy carbons, sintered products of organic polymers (products obtained by sintering a phenol resin, a furan resin or the like at an appropriate temperature for carbonization), carbon fibers, activated carbons or the like can be used.

As the aforementioned oxide material, a metal oxide or a non-metal oxide can be used, and examples thereof can include an oxide of titanium, vanadium, silicon or the like. The aforementioned metal oxides or the aforementioned non-metal oxides may contain carbons.

The aforementioned alloy material is a compound represented by the following formula:

wherein

M' represents one or more elements capable of forming an alloy with lithium;

M" represents one or more elements other than lithium or other than the aforementioned M';

t represents a positive number; u represents 0 or a positive number; and v represents 0 or a positive number.

As the aforementioned M', elements of the 2A, 3A, 4A, 5A, 6A, 1B, 2B, 3B, 4B or 5B group are preferable, elements of the 4B group are more preferable, Si or Sn is more preferable, and in particular, Si is preferable.

As M", elements of the 2A, 3B, 4B, 5B or 6B group, other than those of M' are preferable, semiconductor elements such as B, Si, As or the like are preferable.

As examples of the aforementioned alloy materials, mention may be made of, for example, an elemental substance such as Mg, B, Al, Ga, In, Si, Ge, Sn, Pb, Sb, Bi, Cd, Ag, Zn, Hf, Zr, or Y; an alloy such as AlSb, CuMgSb or the like; Li—Al, or Li—Al—Q (wherein Q is transition metal element of the 2A, 3B and/or 4B group); $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $Ge_2N_2O$, $SiO_t$ ($0<t\leq2$), LiSiO, LiSnO or the like.

The method for producing a negative electrode material is not particularly limited. A method in which raw materials are mixed by means of mechanical alloying or the like and the mixture is subjected to a heat treatment under an inert atmosphere or under a reduction atmosphere is preferable. In this case, two or more types of raw materials may be mixed. In the case of using a negative electrode material containing no lithium, lithium may be electrochemically doped on the negative electrode material before a battery is prepared, or after a battery is prepared.

With the negative electrode material obtained in accordance with the aforementioned method, a negative electrode for use in a secondary battery can be produced in accordance with a common method in the art. For example, the aforementioned negative electrode material is mixed with a conductive agent such as carbon black or the like and a binder, followed by applying the mixture on a negative electrode collector such as a metal foil or the like. In the aforementioned collector, a metal which does not form an alloy with lithium is preferable, and use of copper and nickel is preferable. Plated products thereof can also be used.

The aforementioned non-aqueous electrolyte is not particularly limited. As examples thereof, mention may be made of, for example, a non-aqueous electrolyte in which an electrolyte is dissolved in a non-aqueous solvent, a solid electrolyte, or a gel electrolyte in which a non-aqueous electrolytic solution obtained by dissolving an electrolyte salt in a non-aqueous solvent is impregnated in a matrix.

The aforementioned non-aqueous electrolyte can be prepared by appropriately combining an organic solvent and an electrolyte. The organic solvent is not particularly limited as long as the organic solvents can be used in a battery of this type. As examples of organic solvents, mention may be made of, for example, propylene carbonate, ethylene carbonate, diethyl carbonate, dimethyl carbonate, 1,2-dimethoxyethane, 1,2-diethoxyethane, gamma-butyrolactone, tetrahydrofuran, 2-methyltetrahydrofuran, 1,3-dioxolan, 4-methyl-1,3-dioxolan, diethyl ether, sulforane, methylsulforane, acetonitrile, propionitrile, anisole, acetic esters, butylic esters, propionic esters and the like.

As the aforementioned solid electrolyte, an inorganic solid electrolyte or a polymer solid electrolyte can be used as long as the solid electrolyte is a material having lithium ion conductivity. As examples of inorganic solid electrolytes, mention may be made of, for example, lithium nitride, lithium iodide, crystalline sulfide, glass sulfide and the like. The polymer solid electrolyte is formed from an electrolyte salt and a polymer compound for dissolving the same. As examples of the aforementioned polymer compounds, mention may be made of, for example, homopolymers or copolymers of ether-based polymers such as poly(ethylene oxide) and cross-linked products thereof and the like; or methacrylate-based polymers; acrylate-based polymers and the like or mixtures thereof.

A material of the matrix of the aforementioned gel electrolyte is not particularly limited as long as the material can absorb the non-aqueous electrolytic solution and form a gel. For example, fluorine-based polymers such as poly(vinylidene fluoride), poly(vinylidene fluoride-hexafluoropropylene) copolymers and the like; ether-based polymers such as poly(ethylene oxide) and cross-linked products thereof; and polymers of poly(acrylonitrile) and the like can be suitably used. In view of redox stability, fluorine-based polymers are preferably used.

To the aforementioned non-aqueous electrolyte, ionic conductivity is provided by the presence of an electrolyte. Any electrolyte can be used as long as the electrolyte is used in a battery of this type. For example, $LiClO_4$, $LiAsF_6$, $LiPF_6$, $LiBF_4$, $LiB(C_6H_5)_4$, $CH_3SO_3Li$, $CF_3SO_3Li$, $Li(FS(=O)_2NS(=O)_2F$, $Li(CF_3S(=O)_2NS(=O)_2CF_3)$, $LiCl$, $LiBr$ or the like can be used.

In the present invention, the silicon-based polymer compound is used as a silicon source, that is different from the conventional method for producing a lithium transition metal silicate using an inorganic compound as a silicon source. For this reason, synthesis at lower temperatures can be carried out and reaction control is easier, compared with conventional synthesis reactions. In addition, the particle size of the obtained lithium transition metal silicate is small and the particle size distribution is small. In addition, with the secondary battery of the present invention equipped with the positive electrode formed from the aforementioned lithium transition metal silicate, a battery system having great improvements in view of safety, stability, capacity and cost can be established.

The secondary battery of the present invention can be typically produced as a coin type battery. In addition thereto, the secondary batteries of the present invention can be in various forms such as a laminate form, a pack form, a button form, a gum form, an assembled battery form, a square form and the like.

EXAMPLES

Hereinafter, the present invention is described in detail with reference to Examples. It should be understood that the present invention is not limited to the Examples.

Comparative Example 1

$Li_2FeSiO_4$ was synthesized as described below. $Li_2CO_3$ (Wako Pure Chemical Industries, Ltd., 99.0%), $FeC_2O_4 \cdot 2H_2O$ (Aldrich Corporation, 99%), and amorphous $SiO_2$ (Kanto Chemical Co., Inc., 99%) as a silicon source were weighed so as to have a stoichiometrical proportion. The mixture, 150 ml of ethanol as a solvent and chrome steel balls (15 mm×10 and 10 mm×16) were together placed in a container made of chrome steel (250 ml), followed by press-mixing at 240 rpm for 24 hours by means of a planetary pot mill (Ito Seisakusho Co., Ltd.; LP. 4). Subsequently, the mixture was sintered for 15 hours under an argon current at various temperatures in a tubular furnace.

Example 1

Synthesis of $Li_2FeSiO_4$ was carried out under the same conditions as described in Comparative Example 1, with the exception of replacing the silicon source in Comparative Example 1 with a phenylsilicone resin $(C_6H_5SiO_{1.5})_n$.

X-Ray Diffraction Experiment

An X-ray diffraction experiment was carried out with respect to each of the samples obtained in Comparative Example 1 and Example 1. In particular, measurement was carried out using a CoKα ray monochromated by a filter, using a tube voltage of 35 kV and a tube current of 40 mA, using a measurement angle of 15°<2θ<80°, and a step interval of 0.028°. During the measurement, effects of errors of integrated intensity due to big particles were controlled by rotating a sample stage at 30 rpm. X-ray diffraction patterns of Comparative Example 1 are shown in FIG. 1, and X-ray diffraction patterns of Example 1 are shown in FIG. 2.

Figure 2:
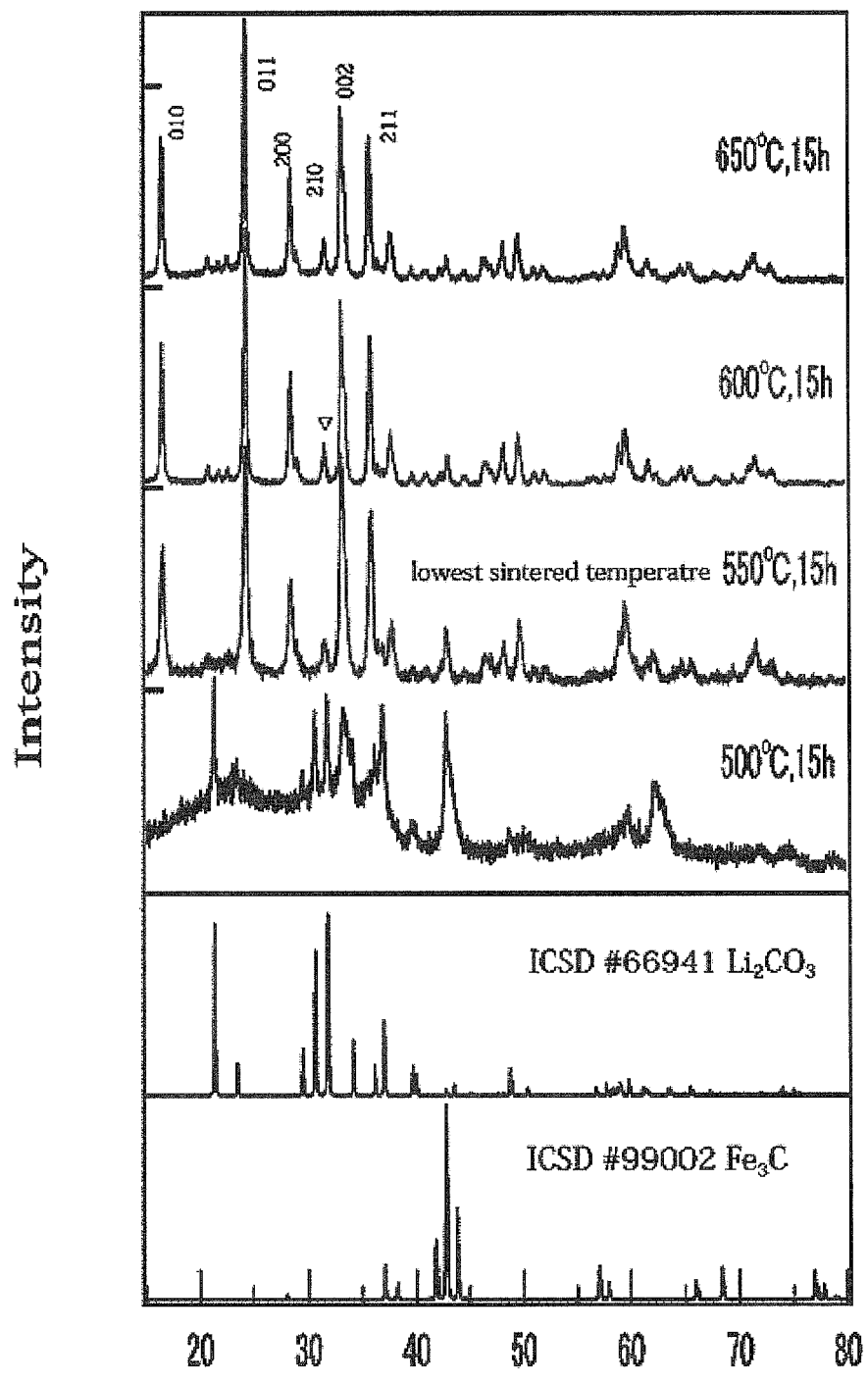
FIG. 2 X-ray diffraction patterns of Example 1.

As is apparent from FIG. 1 and FIG. 2, in Comparative Example 1, many impurities remain at temperatures of 650° C. or less, and $Li_2FeSiO_4$ in a single phase cannot be obtained. On the other hand, in Example 1, $Li_2FeSiO_4$ in a single phase can be obtained at 550° C. As described above, by using $(C_6H_5SiO_{1.5})_n$ as a raw material, the synthesis temperatures can be reduced by 100° C.

Figure 3:
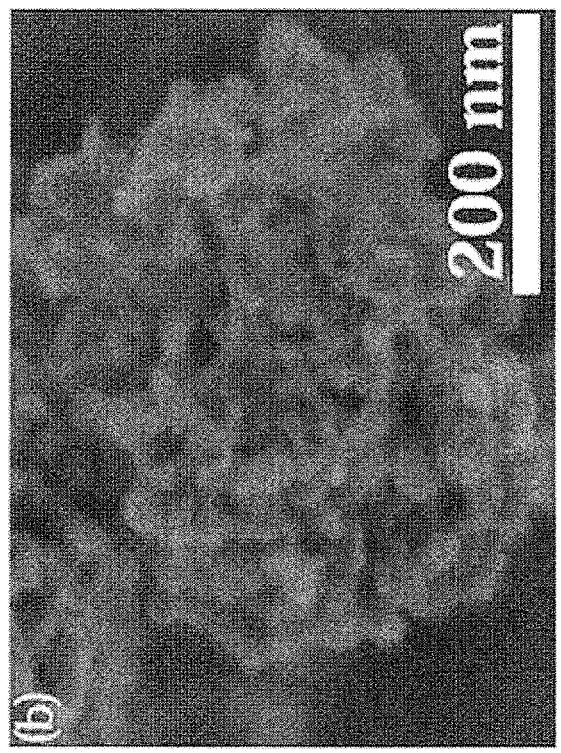
FIG. 3 An electron micrograph of Comparative Example 1 (FIG. 3(a)) and an electron micrograph of Example 1 (FIG. 3(b)).
Figure 3:
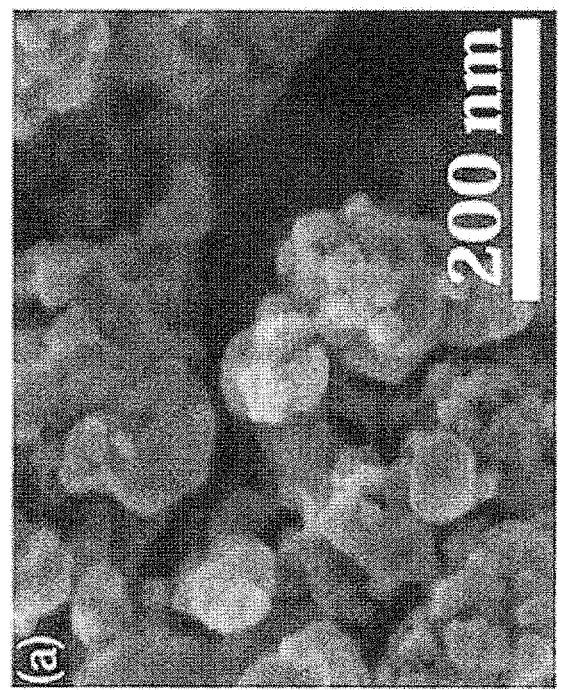

Electron Microscope Observation $Li_2FeSiO_4$ prepared in each of Comparative Example 1 and Example 1 was independently observed by means of a scanning electron microscope. In particular, a powder sample was sufficiently pulverized in a mortar, and the pulverized sample was dispersed on a microscope stage on which a carbon paste had been applied. Thereby, measurement was carried out. In order to avoid charge-up occurred at the time of observing an insulant sample, measurement was carried out with a low accelerating voltage such as 1.0 kV. An electron micrograph of Comparative Example 1 is shown in FIG. 3(a), and an electron micrograph of Example 1 is shown in FIG. 3(b).

In the micrograph of Comparative Example 1, the average particle size is about 70 nm. In contrast, in the micrograph of Example 1, the average particle size is about 30 nm. As described above, use of $(C_6H_5SiO_{1.5})_n$ as a raw material can reduce the synthesis temperature by 100° C., and grain growth can be controlled. Thereby, finer particles can be obtained.

Measurement of Charge and Discharge Characteristics $Li_2FeSiO_4$ obtained in Comparative Example 1 was used in a positive electrode, and charge and discharge characteristics were measured by means of a 2032 model coin cell (Hohsen Corp.). With respect to the positive electrode active substance, ketjen black as a conductive auxiliary agent and a polyvinylidene fluoride (PVDF) powder (Kureha Corporation) as a binder were weighed so that the weight ratio thereof was 8:1:1. N-methylpyrrolidone (NMP) (Wako Pure Chemical Industries, Ltd.), in an appropriate amount, as a solvent was added thereto, and mixed. Thereby, a paste in which the active substance was uniformly dispersed was prepared.

As a collector for the positive electrode, an aluminum foil having a thickness of 0.1 mm (The Niraco Corporation) was used, and a paste containing the active substance was applied by means of a 50 μm doctor blade. In order to evaporate the solvent, drying was carried out in a drier machine at 120° C.

An electrode was punched out with a diameter of 16 mm, and compressed at 50 MPa so as not to separate the sample from the collector. In order to improve collecting properties, an aluminum mesh with a diameter of 18 mm was interleaved between the positive electrode and the positive electrode can, and they were integrated by pressing these at 20 MPa. As a negative electrode, a metal lithium punched out with a diameter of 12 mm (Honjo Metal Co., Ltd.) was used, and as a separator, a porous polypropylene film punched out with a diameter of 19 mm was used. As an electrolytic solution, a solution obtained by dissolving $LiPF_6$ as a support electrolyte in a solvent mixture of ethylene carbonate (EC) and diethyl carbonate (DEC) in a volume ratio of 7:3 to have a concentration of $1.0 \text{ mol} \cdot dm^{-3}$ was used. Preparation of a battery was carried out in a glove box under an argon atmosphere.

Figure 4:
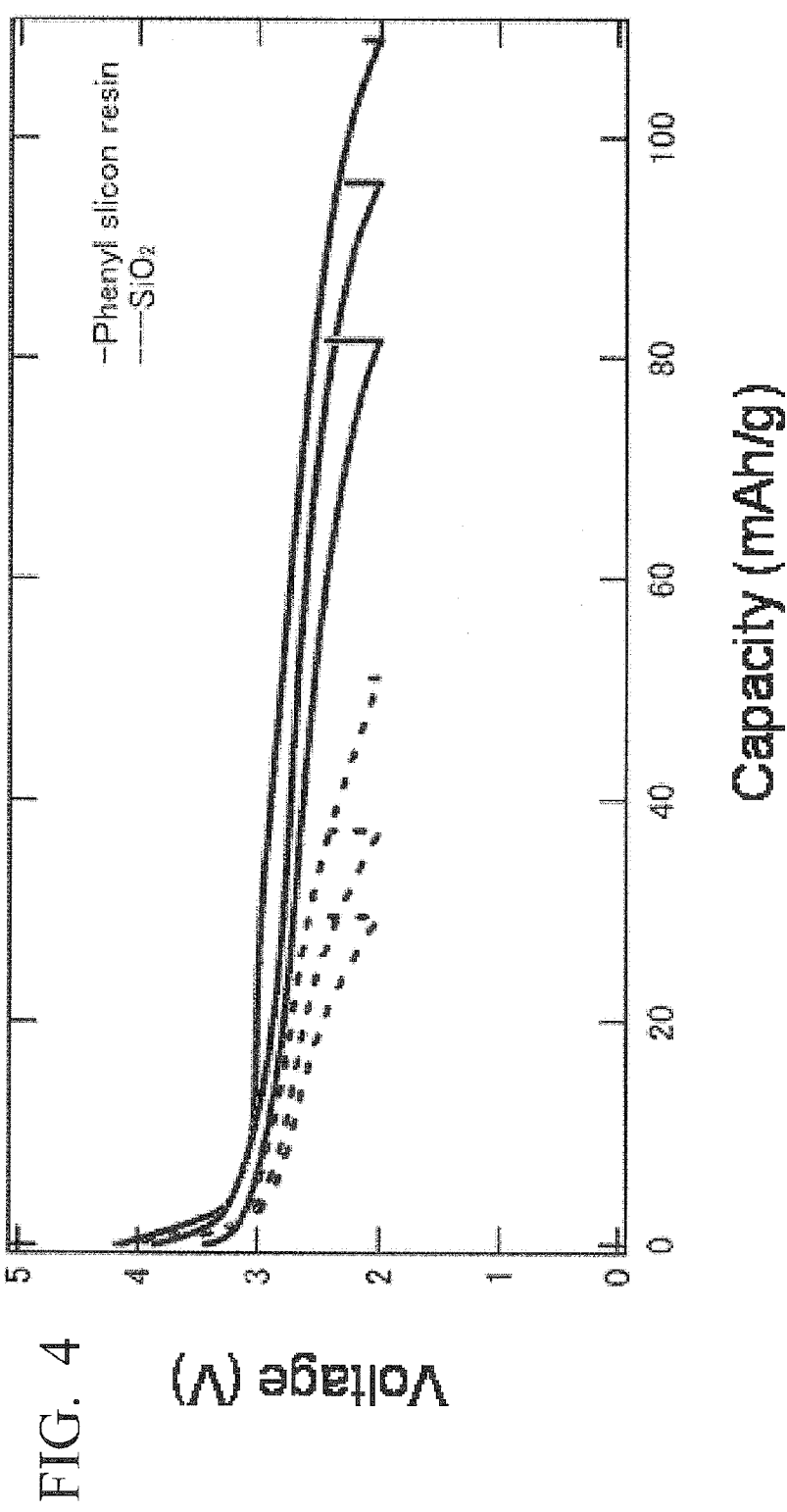
FIG. 4 Graphs showing discharge characteristics of Comparative Example 1 (dotted line) and Example 1 (solid line).

In the charge and discharge cycle test of the prepared battery, TOSCAT-3100 (Toyo System Corporation) was used, and measurement was carried out at various current densities. The results are shown in FIG. 4 with dotted lines.

In the same manner as described above, $Li_2FeSiO_4$ obtained in Example 1 was used in a positive electrode, and charge and discharge characteristics were measured by means of a 2032 model coin cell (Hohsen Corp.). The results are shown in FIG. 4 with solid lines. Discharged capacities twice or three times those of Comparative Example 1 were obtained.

Comparative Example 2

$Li_2MnSiO_4$ was synthesized in the same manner as described in Comparative Example 1, with the exception that as a raw material, $Li_2SiO_3$ as a lithium and silicon source, $MnC_2O_4 \cdot \frac{1}{2}H_2O$, and ketjen black (KB) were used, pellets were formed by compression mixing, and sintering was carried out for 10 hours at 750° C. under an argon atmosphere.

Example 2

$Li_2MnSiO_4$ was synthesized under the same conditions as described in Comparative Example 2, with the exception that $Li_2CO_3$ was used as a lithium source and a phenylsilicone resin $(C_6H_5SiO_{1.5})_n$ was used as a silicon source.

X-Ray Diffraction Experiments

Figure 5:
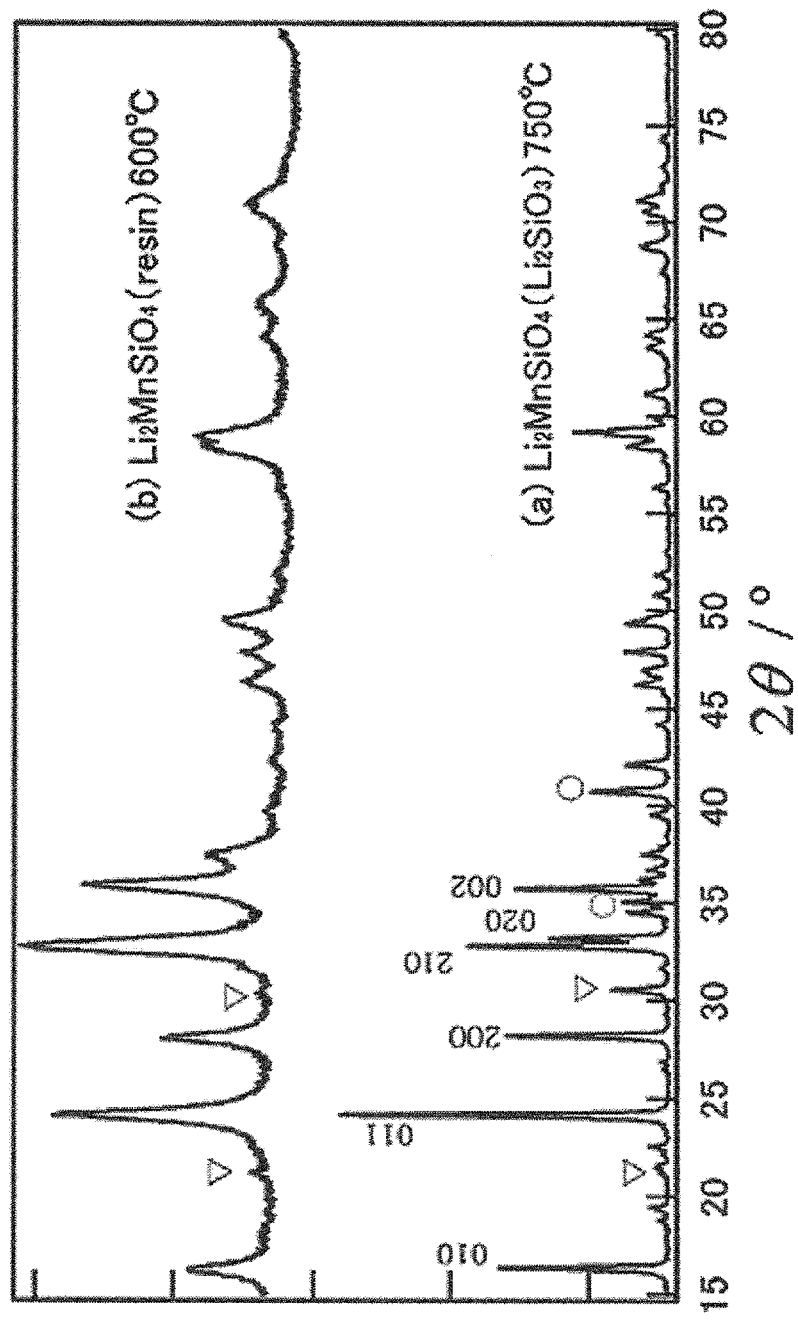
FIG. 5 X-ray diffraction patterns of Comparative Example 2(a) and Example 2(b).

With respect to the samples obtained in Comparative Example 2 and Example 2, X-ray diffraction experiments were independently carried out. In particular, a CuKα ray monochromated by means of a filter was used, measurements were carried out with an X-ray tube voltage and an X-ray tube current of 50 kV and 180 mA, respectively, a measurement angle of $15°<2\theta<80°$, and a step interval of 0.028°. The results are shown in FIG. 5. (a) in FIG. 5 shows Comparative Example 2 and (b) in FIG. 5 shows Example 2.

In Comparative Example 2, many impurities remain at temperatures of 750° C. or less, and a single phase $Li_2FeSiO_4$ cannot be obtained. In contrast, in Example 2, an almost single phase $Li_2FeSiO_4$ can be obtained at 600° C. As described above, use of $(C_6H_5SiO_{1.5})$, as a raw material can reduce the synthesis temperature by about 150° C.

Figure 6:
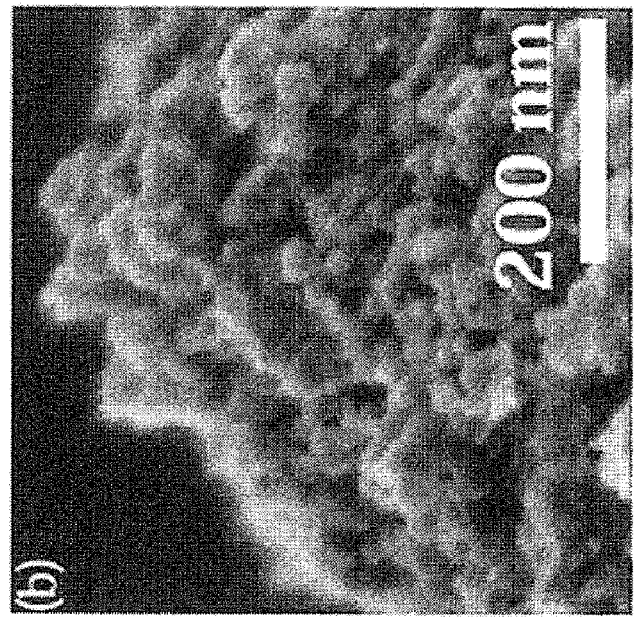
FIG. 6 An electron micrograph of Comparative Example 2 (FIG. 6(a)) and an electron micrograph of Example 2 (FIG. 6(b)).
Figure 6:
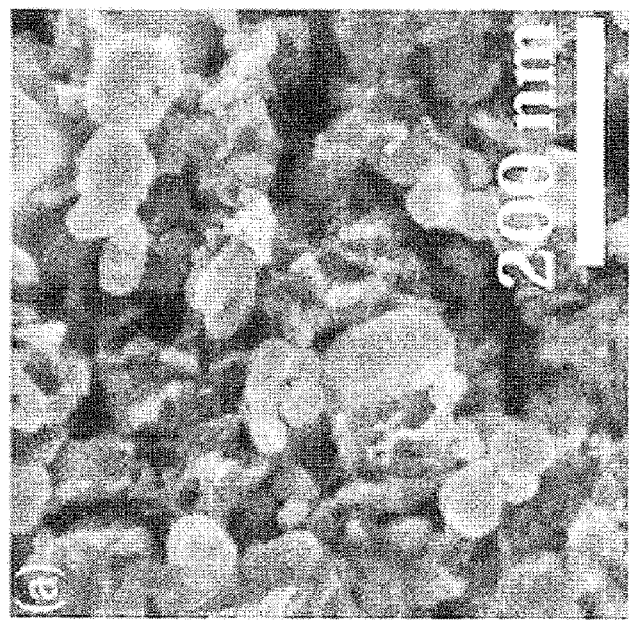

Electron Microscope Observation $Li_2MnSiO_4$ prepared in each of Comparative Example 2 and Example 2 was independently observed by means of a scanning electron microscope. In particular, a powder sample was sufficiently pulverized in a mortar, and the pulverized sample was dispersed on a microscope stage on which a carbon paste had been applied. Thereby, measurement was carried out. In order to avoid charge-up occurring at the time of observing an insulant sample, measurement was carried out with a low accelerating voltage such as 1.0 kV. An electron micrograph of Comparative Example 2 is shown in FIG. 6(a), and an electron micrograph of Example 2 is shown in FIG. 6(b).

In the micrograph of Comparative Example 2, the average particle size is about 80 nm. In contrast, in the micrograph of Example 2, the average particle size is about 15 nm. As described above, use of $(C_6H_5SiO_{1.5})_n$ as a raw material can reduce the synthesis temperature by 150° C., and grain growth can be controlled. Thereby, finer particles can be obtained.

Measurement of Charge and Discharge Characteristics $Li_2MnSiO_4$ obtained in Comparative Example 2 was used in a positive electrode, and charge and discharge characteristics were measured by means of a 2032 model coin cell (Hohsen Corp.). With respect to the positive electrode active substance, ketjen black as a conductive auxiliary agent and a polyvinylidene fluoride (PVDF) powder (Kureha Corporation) as a binder were weighed so that the weight ratio thereof was 8:1:1. N-methylpyrrolidone (NMP) (Wako Pure Chemical Industries, Ltd.), in an appropriate amount, as a solvent was added thereto, and mixed. Thereby, a paste in which the active substance was uniformly dispersed was prepared.

As a collector for the positive electrode, an aluminum foil having a thickness of 0.1 mm (The Niraco Corporation) was used, and a paste containing the active substance was applied by means of a 50 μm doctor blade. In order to evaporate the solvent, drying was carried out in a drier machine at 120° C.

An electrode was punched out with a diameter of 16 mm, and compressed at 50 MPa so as not to separate the sample from the collector. In order to improve collecting properties, an aluminum mesh with a diameter of 18 mm was interleaved between the positive electrode and the positive electrode can, and they were integrated by pressing these at 20 MPa. As a negative electrode, a metal lithium punched out with a diameter of 12 mm (Honjo Metal Co., Ltd.) was used, and as a separator, a porous polypropylene film punched out with a diameter of 19 mm was used. As an electrolytic solution, a solution obtained by dissolving $LiPF_6$ as a support electrolyte in a solvent mixture of ethylene carbonate (EC) and diethyl carbonate (DEC) in a volume ratio of 7:3 to have a concentration of 1.0 mol·dm$^{-3}$, was used. Preparation of a battery was carried out in a glove box under an argon atmosphere.

Figure 7:
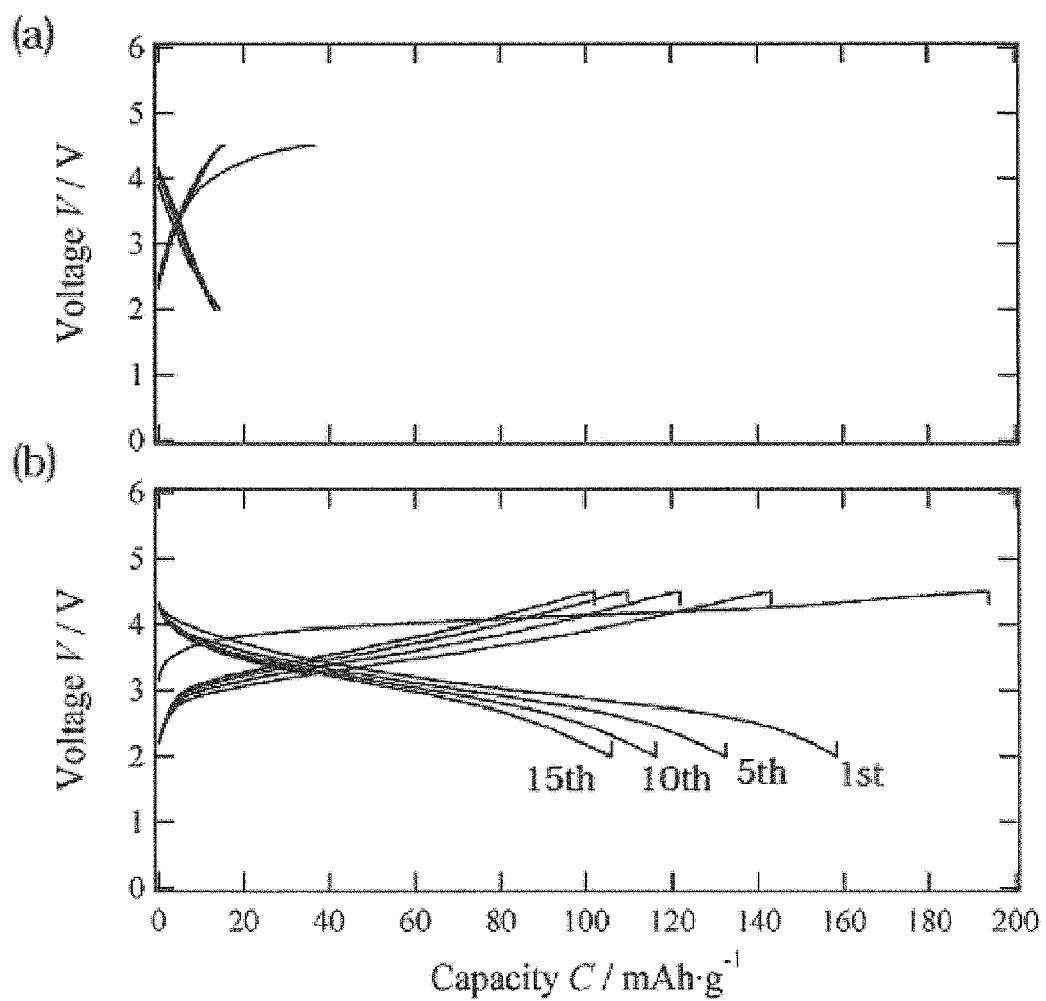
FIG. 7 Graphs showing charge and discharge characteristics of Comparative Example 2 (graph (a)) and Example 2 (graph (b)).

In the charge and discharge cycle test of the prepared battery, TOSCAT-3100 (Toyo System Corporation) was used, and measurement was carried out at various current densities. The results are shown in FIG. 7. FIG. 7(a) shows Comparative Example 2.

In the same manner as described above, $Li_2MnSiO_4$ obtained in Example 2 was used in a positive electrode, and charge and discharge characteristics were measured by means of a 2032 model coin cell (Hohsen Corp.). The results are shown in FIG. 7. FIG. 7(b) shows Example 2.

Comparative Example 3

$Li_2CoSiO_4$ was synthesized in the same manner as described in Comparative Example 1, with the exception that as a raw material, $Li_2CO_3$, $CoC_2O_4$·½$H_2O$, and $SiO_2$ as a silicon source were used, pellets were formed by compression mixing, and sintering was carried out for 10 hours at various temperatures under an air atmosphere.

Example 3

Synthesis was carried out under the same conditions as described in Comparative Example 3, with the exception that a phenylsilicone resin $(C_6H_5SiO_{1.5})_n$ was used as a silicon source.

X-Ray Diffraction Experiments

Figure 8:
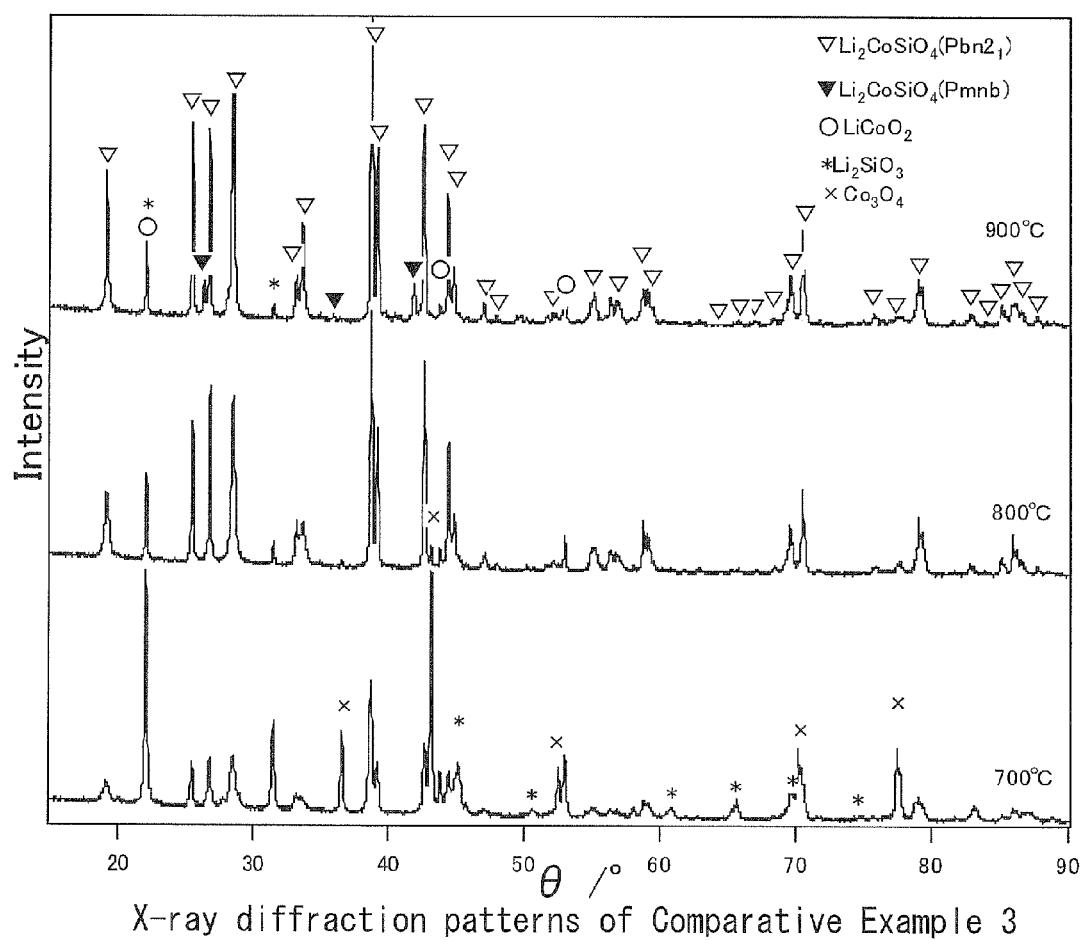
FIG. 8 X-ray diffraction patterns of Comparative Example 3.
Figure 9:
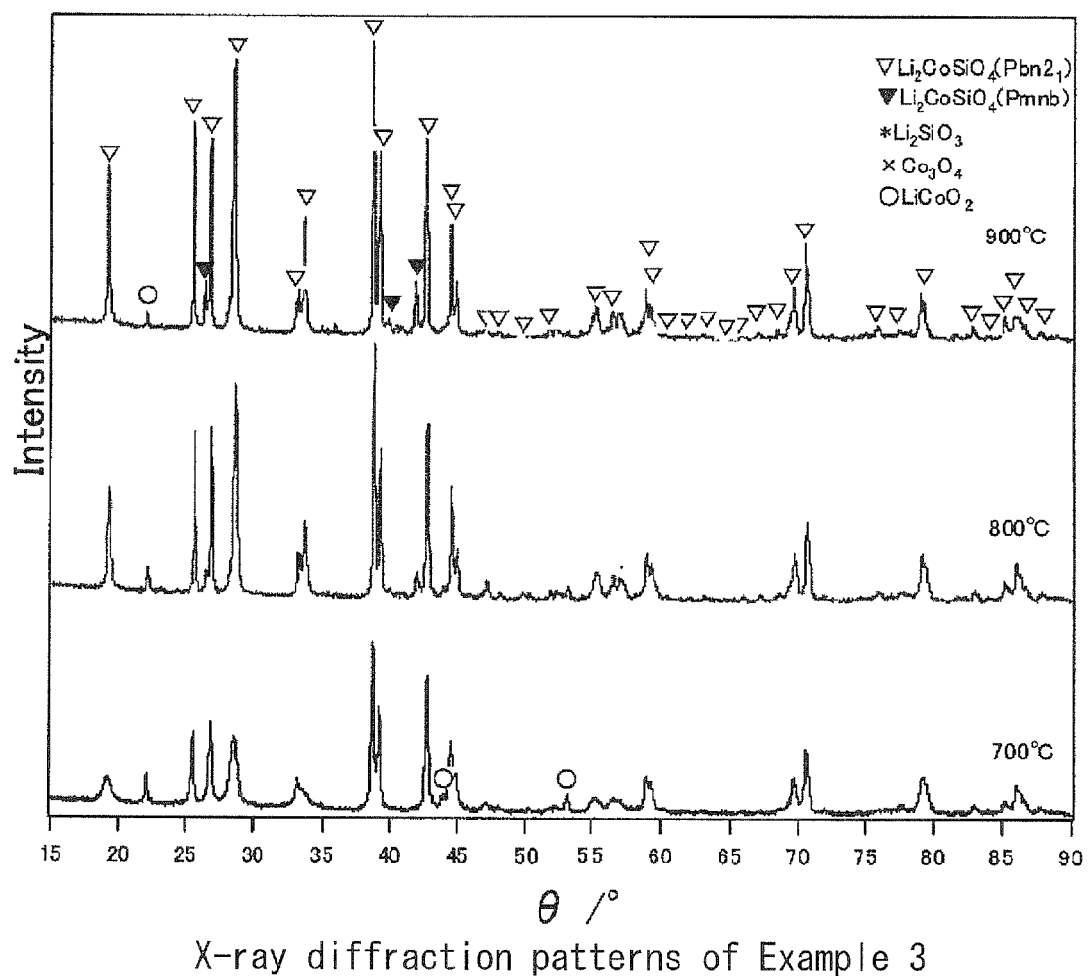
FIG. 9 X-ray diffraction patterns of Example 3.

With respect to the samples obtained in Comparative Example 3 and Example 3, X-ray diffraction experiments were independently carried out. In particular, a CuKα ray monochromated by means of a filter was used, measurements were carried out with an X-ray tube voltage and an X-ray tube current of 35 kV and 40 mA, respectively, a measurement angle of 15°<2θ<80°, and a step interval of 0.028°. The results are shown in FIG. 8 and FIG. 9. FIG. 8 shows Comparative Example 3 and FIG. 9 shows Example 3.

In Comparative Example 3, many impurities remain at temperatures of 800° C. or less, and a single phase $Li_2CoSiO_4$ cannot be obtained. In contrast, in Example 3, an almost single phase $Li_2CoSiO_4$ can be obtained at 700° C. As described above, use of $(C_6H_5SiO_{1.5})_n$ as a raw material can reduce the synthesis temperature by about 100° C.

Figure 10:
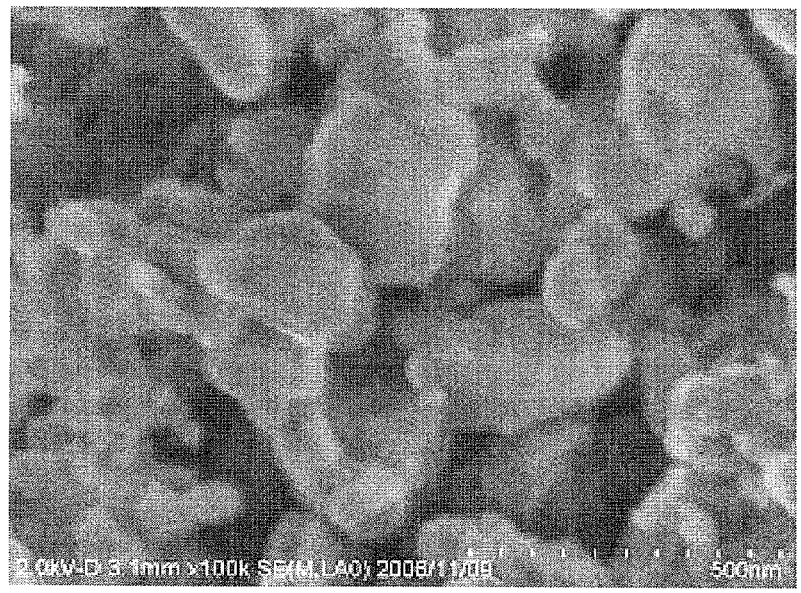
FIG. 10 An electron micrograph of Comparative Example 3.
Figure 11:
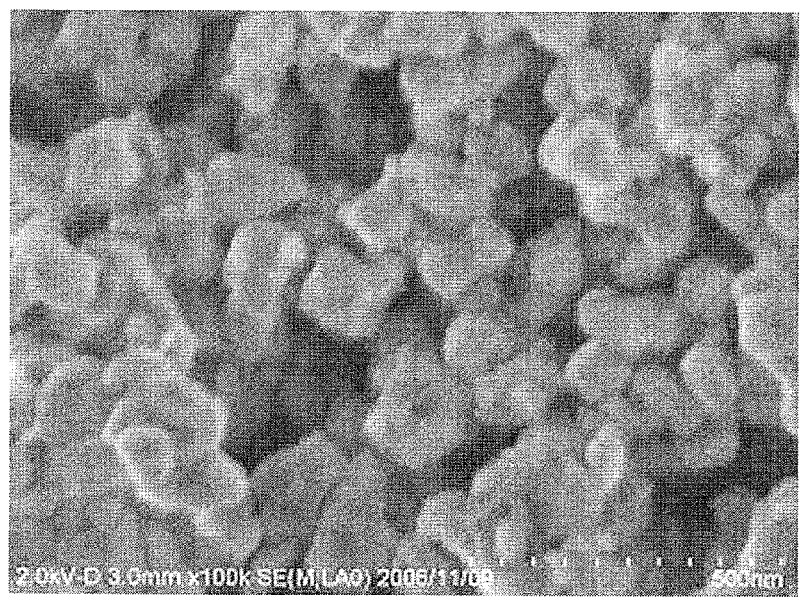
FIG. 11 An electron micrograph of Example 3.

Electron Microscope Observation $Li_2CoSiO_4$ respectively prepared in each of Comparative Example 3 and Example 3 at 700° C. of the sintering temperature was independently observed by means of a scanning electron microscope. In particular, a powder sample was sufficiently pulverized in a mortar, and the pulverized sample was dispersed on a microscope stage on which a carbon paste had been applied. Thereby, measurement was carried out. In order to avoid charge-up occurring at the time of observing an insulant sample, measurement was carried out with a low accelerating voltage such as 1.0 kV. An electron micrograph of Comparative Example 3 is shown in FIG. 10, and an electron micrograph of Example 3 is shown in FIG. 11.

In the micrograph of Comparative Example 3, the average particle size has a broad distribution ranging from about 70 nm to 300 nm. In contrast, in the micrograph of Example 3, the average particle size is about 70 nm. As described above, use of $(C_6H_5SiO_{1.5})_n$ as a raw material can reduce the synthesis temperature by about 100° C., and grain growth can be controlled. Thereby, finer particles can be obtained.

Measurement of Charge and Discharge Characteristics $Li_2CoSiO_4$ obtained by sintering at 800° C. in Comparative Example 3 was used in a positive electrode, and charge and discharge characteristics were measured by means of a 2032 model coin cell (Hohsen Corp.). With respect to the positive electrode active substance, ketjen black as a conductive auxiliary agent and a polyvinylidene fluoride (PVDF) powder (Kureha Corporation) as a binder were weighed so that the weight ratio thereof was 8:1:1. N-methylpyrrolidone (NMP) (Wako Pure Chemical Industries, Ltd.), in an appropriate amount, as a solvent was added thereto, and mixed. Thereby, a paste in which the active substance was uniformly dispersed was prepared.

As a collector for the positive electrode, an aluminum foil having a thickness of 0.1 mm (The Niraco Corporation) was used, and a paste containing the active substance was applied by means of a 50 μm doctor blade. In order to evaporate the solvent, drying was carried out in a drier machine at 120° C.

An electrode was punched out with a diameter of 16 mm, and compressed at 50 MPa so as not to separate the sample from the collector. In order to improve collecting properties, an aluminum mesh with a diameter of 18 mm was interleaved between the positive electrode and the positive electrode can, and they were integrated by pressing these at 20 MPa. As a negative electrode, a metal lithium punched out with a diameter of 12 mm (Honjo Metal Co., Ltd.) was used, and as a separator, a porous polypropylene film punched out with a diameter of 19 mm was used. As an electrolytic solution, a solution obtained by dissolving $LiPF_6$ as a support electrolyte in a solvent mixture of ethylene carbonate (EC) and diethyl carbonate (DEC) in a volume ratio of 7:3 to have a concentration of 1.0 mol·dm$^{-3}$, was used. Preparation of a battery was carried out in a glove box under an argon atmosphere.

Figure 12:
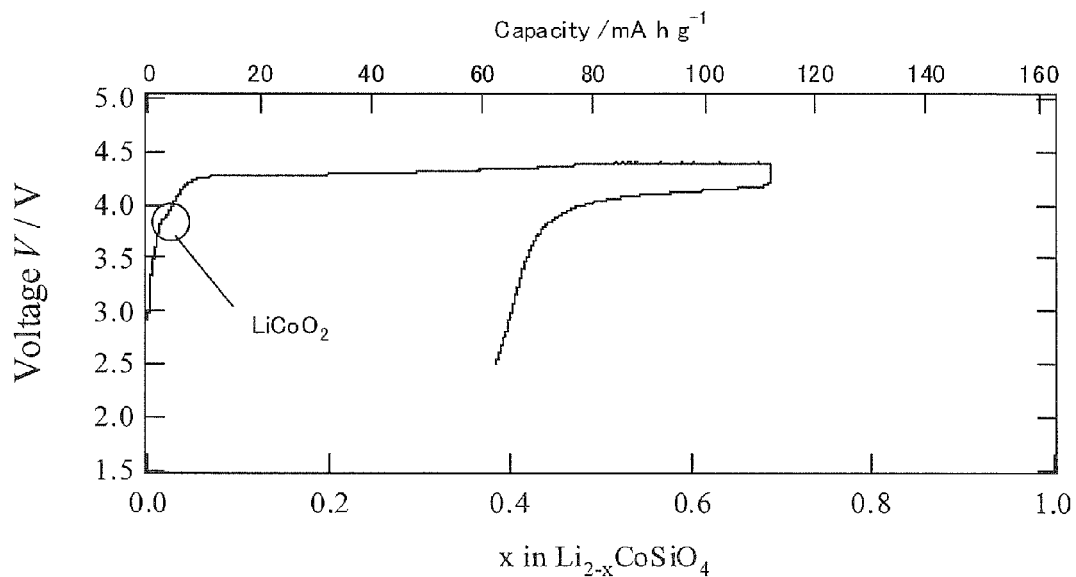
FIG. 12 Graphs showing discharge characteristics of Comparative Example 3.

In the charge and discharge cycle test of the prepared battery, TOSCAT-3100 (Toyo System Corporation) was used, and measurement was carried out at various current densities. The results are shown in FIG. 12.

Figure 13:
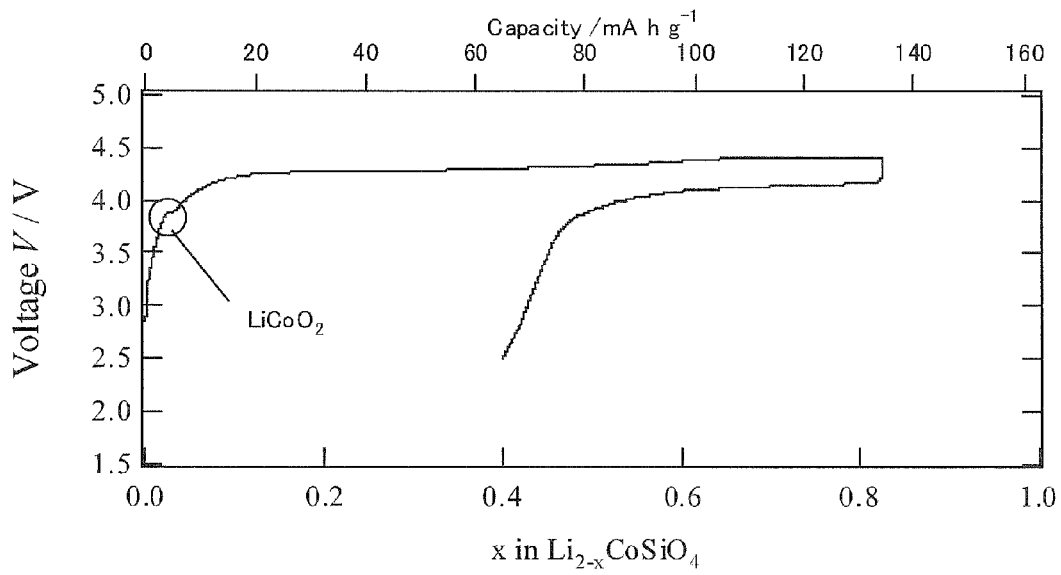
FIG. 13 Graphs showing discharge characteristics of Example 3.

In the same manner as described above, $Li_2CoSiO_4$ obtained by sintering at 700° C. in Example 3 was used in a positive electrode, and charge and discharge characteristics were measured by means of a 2032 model coin cell (Hohsen Corp.). The results are shown in FIG. 13.

It can be seen that in Example 3, compared with Comparative Example 3, the initial charged capacity was remarkably improved from 117.9 mAh/g to 134 mAh/g, and the initial discharged capacity was remarkably improved from 49.5 mAh/g to 69.5 mAh/g, respectively.

Example 4

$Li_2Fe_{0.5}Mn_{0.5}SiO_4$ was synthesized. In particular, a phenyl silicone resin $(C_6H_5SiO_{1.5})_n$, $FeC_2O_4·2H_2O$, $MnC_2O_4·0.5H_2O$, and $Li_2CO_3$ were used as raw materials, and as a conductive auxiliary agent, ketjen black (KB) was added thereto so that the residual KB comprises 10% in the final product. Subsequently, the mixture was pulverized and mixed by means of a planetary type ball mill, and the mixture was sintered at 600° C. under an argon stream. The obtained powder was subjected to measurement of X-ray powder diffraction. As a result, in the powder pattern of $Li_2Fe_{0.5}Mn_{0.5}SiO_4$, peak splitting was not observed. For this reason, a solid solution of Fe and Mn was confirmed. In addition, from the observation by means of a scanning electron microscope in the same manner as described above, it could be confirmed that the average particle size ranged from about 30 to 40 nm.

Figure 14:
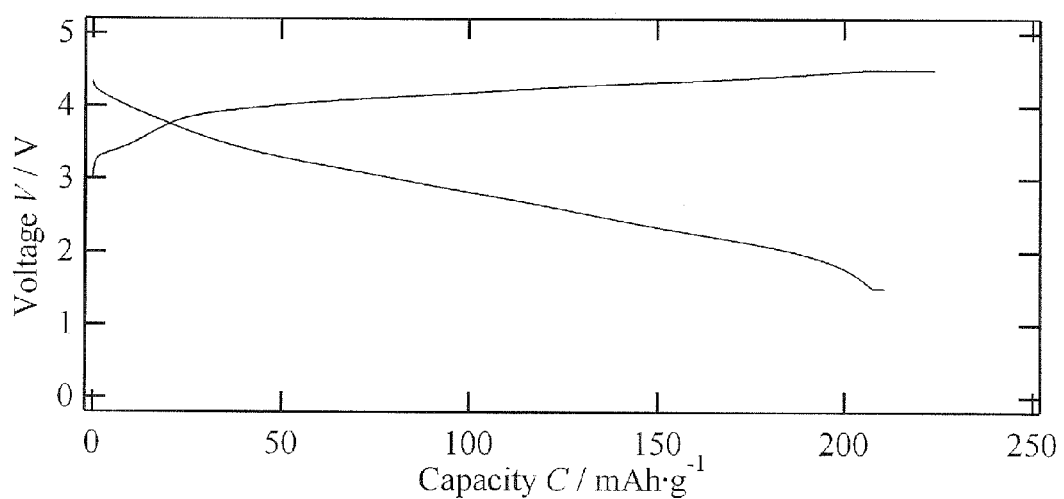
FIG. 14 Graphs showing charge and discharge characteristics of Example 4.

In addition, charge and discharge characteristics of a battery in which the $Li_2Fe_{0.5}Mn_{0.5}SiO_4$ synthesized as described above was used in a positive electrode were measured. A 2032 model coin cell was prepared, in which a material obtained by mixing $Li_2Fe_{0.5}Mn_{0.5}SiO_4$, ketjen black (KB) and polyvinylidene fluoride (PVDF) so that $Li_2Fe_{0.5}Mn_{0.5}SiO_4$:KB: PVDF was 9:1:1 in a weight ratio was used as a positive electrode, a metal lithium was used as a negative electrode, and a solution obtained by dissolving $LiPF_6$ as a support electrolyte in a solvent mixture of ethylene carbonate (EC) and diethyl carbonate (DEC) in a volume ratio of 3:7 to have a concentration of 1.0 mol·dm$^{-3}$, was used as an electrolytic solution. Thereby, the electrode characteristics were evaluated. As described in FIG. 14, 210 mAh g$^{-1}$ corresponding to 1.27 electron reaction per transition metal atom at 60° C. was exhibited.

The invention claimed is:

1. A method for producing a positive electrode material for a secondary battery containing a lithium transition metal silicate represented by the following formula:

$$Li_aM_bSi_cO_4$$

wherein M is at least one transition metal selected from the group consisting of Mn, Fe, Co and Ni; a, b and c are numbers satisfying $1<a\leq3$, $0.5\leq b\leq1.5$, and $0.5\leq c\leq1.5$, said method comprising the step of obtaining said lithium transition metal silicate by sintering a mixture containing at least (A) at least one transition metal selected from the group consisting of Mn, Fe, Co and Ni, and/or a transition metal compound containing the aforementioned transition metal;

(B) a lithium compound; and (C) a silicon-based polymer compound.

2. The method according to claim 1, wherein said sintering is carried out at temperatures of not more than 900° C.

3. The method according to claim 2, wherein said silicon-based polymer compound of said component (C) is at least one silicon-based polymer compound selected from the group consisting of polysilanes, polysilazanes, polysiloxanes, polycarbosilanes, and mixtures thereof.

4. The method according to claim 2, wherein said silicon-based polymer compound of said component (C) is a polyphenylsilsesquioxane represented by the following repeating unit:

$$C_6H_5SiO_{1.5}.$$

5. The method according to claim 1, wherein said lithium transition metal silicate is a particle having an average primary particle size of less than 500 nm.

6. The method according to claim 1, wherein said compound containing said transition metal in said component (A) is at least one transition metal compound selected from the group consisting of transition metal oxides, transition metal hydroxides, transition metal alkoxides, transition metal carboxylates, transition metal acetylacetonates, transition metal ethyl acetoacetates, transition metal carbonates, transition metal nitrates, transition metal sulfates, transition metal halides, and carbonyl complexes of the transition metals.

7. The method according to claim 1, wherein said lithium compound of said component (B) is at least one lithium compound selected from the group consisting of lithium oxide, lithium hydroxide, lithium alkoxides, lithium carboxylates, lithium acetylacetonate, lithium ethyl acetoacetate, lithium carbonate, lithium nitrate, lithium sulfate, and lithium halides.

8. The method according to claim 1, wherein said silicon-based polymer compound of said component (C) is at least one silicon-based polymer compound selected from the group consisting of polysilanes, polysilazanes, polysiloxanes, polycarbosilanes, and mixtures thereof.

9. The method according to claim 1, wherein said silicon-based polymer compound of said component (C) is a polyphenylsilsesquioxane represented by the following repeating unit:

$$C_6H_5SiO_{1.5}.$$

* * * * *